United States Patent
Varadharajan et al.

(10) Patent No.: US 9,760,444 B2
(45) Date of Patent: Sep. 12, 2017

(54) SHARING OF SECONDARY STORAGE DATA

(71) Applicant: CommVault Systems, Inc., Oceanport, NJ (US)

(72) Inventors: Prakash Varadharajan, Manalapan, NJ (US); Anand Vibhor, Eatontown, NJ (US); Amey Vijaykumar Karandikar, Long Branch, NJ (US); Manoj Kumar Vijayan, Marlboro, NJ (US); Deepak Raghunath Attarde, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 267 days.

(21) Appl. No.: 14/152,871

(22) Filed: Jan. 10, 2014

(65) Prior Publication Data

US 2014/0201154 A1     Jul. 17, 2014

Related U.S. Application Data

(60) Provisional application No. 61/752,148, filed on Jan. 14, 2013, provisional application No. 61/751,680, filed on Jan. 11, 2013.

(51) Int. Cl.
*G06F 17/30* (2006.01)
*G06F 11/14* (2006.01)
*G06F 11/20* (2006.01)

(52) U.S. Cl.
CPC ...... *G06F 11/1451* (2013.01); *G06F 11/1448* (2013.01); *G06F 11/1456* (2013.01); *G06F 11/1469* (2013.01); *G06F 11/2094* (2013.01); *G06F 2201/84* (2013.01)

(58) Field of Classification Search
CPC ............. G06F 11/1464; G06F 11/1451; G06F 11/1453; G06F 17/30138
See application file for complete search history.

(56) References Cited

U.S. PATENT DOCUMENTS 4,084,231 A    4/1978  Capozzi et al.
4,267,568 A    5/1981  Dechant et al.
(Continued)

FOREIGN PATENT DOCUMENTS

AU    2004227949    10/2004
CA       2498174     3/2004
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Mariela Reyes
*Assistant Examiner* — Courtney Harmon
(74) *Attorney, Agent, or Firm* — Knobbe, Martens, Olson & Bear, LLP

(57) ABSTRACT

An information management system according to certain aspects allows users to share a portion of a file (e.g., a document) stored in secondary storage. The user may specify a portion of a secondary storage file to share and send a link to the portion to another user. The other user can access the shared portion from the link, and just the shared portion may be restored from secondary storage. The system according to certain aspects provides a native view of secondary storage data on a client computing device. The index data and/or metadata relating to secondary storage data may be stored in native application format for access via the native source application.

21 Claims, 16 Drawing Sheets

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,343,453 B2 | 3/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,653,668 B1 * | 1/2010 | Shelat | G06F 11/2094 707/610 |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,729,926 B1 | 6/2010 | Hopwood | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,606,752 B1 | 12/2013 | Beatty et al. | |
| 9,483,489 B2 | 11/2016 | Varadharajan et al. | |
| 2004/0215635 A1 | 10/2004 | Chang et al. | |
| 2006/0224846 A1 * | 10/2006 | Amarendran | G06F 3/0605 711/162 |
| 2007/0203938 A1 * | 8/2007 | Prahlad | G06F 17/30321 |
| 2008/0275847 A1 | 11/2008 | Chellapilla et al. | |
| 2009/0144416 A1 * | 6/2009 | Chatley | G06F 3/0613 709/224 |
| 2009/0319534 A1 | 12/2009 | Gokhale | |
| 2010/0082672 A1 * | 4/2010 | Kottomtharayil | G06F 11/1451 707/770 |
| 2010/0299490 A1 | 11/2010 | Attarde et al. | |
| 2010/0306412 A1 * | 12/2010 | Therrien | H03M 7/3084 709/247 |
| 2010/0318500 A1 * | 12/2010 | Murphy | G06F 17/30073 707/693 |
| 2010/0333116 A1 * | 12/2010 | Prahlad | G06F 17/3002 719/328 |
| 2011/0161299 A1 * | 6/2011 | Prahlad | G06F 17/30091 707/649 |
| 2012/0084523 A1 * | 4/2012 | Littlefield | G06F 11/1469 711/162 |
| 2012/0150818 A1 | 6/2012 | Vijayan et al. | |
| 2012/0150826 A1 | 6/2012 | Vijayan et al. | |
| 2013/0117255 A1 | 5/2013 | Liu et al. | |
| 2013/0262394 A1 * | 10/2013 | Kumarasamy | G06F 17/30073 707/673 |
| 2014/0041034 A1 | 2/2014 | Li et al. | |
| 2014/0201142 A1 | 7/2014 | Vijayan et al. | |
| 2014/0201153 A1 | 7/2014 | Vijayan et al. | |
| 2014/0201155 A1 | 7/2014 | Vijayan et al. | |
| 2015/0212900 A1 * | 7/2015 | Hayasaka | G06F 11/1453 707/652 |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Eitel, "Backup and Storage Management in Distributed Heterogeneous Environments," IEEE, 1994, pp. 124-126.
IBM Technical Disclosure Bulletin, vol. 24, No. 5, Oct. 1981 New York, US, pp. 2404-2406, K.L. Huff, "Data Set Usage Sequence Number".
Rosenblum et al., "The Design and Implementation of a Log-Structure File System," Operating Systems Review SIGOPS, vol. 25, No. 5, May 1991, New York, US, pp. 1-15.

* cited by examiner

SHARING OF SECONDARY STORAGE DATA

INCORPORATION BY REFERENCE TO ANY PRIORITY APPLICATIONS

Any and all priority claims identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

Enterprises may restore backed up data, for example, when the data in primary storage is archived, migrated, becomes corrupt, or is otherwise unavailable. However, restoring large amounts of data can consume large amounts of time and system resources. Moreover, existing user interfaces for providing user access to secondary copies of data are often not intuitive or user friendly.

SUMMARY

Due to the above challenges, there is a need for restoring and/or sharing files and/or only portions of files from secondary storage. Embodiments described herein allow users to access, browse, and/or share secondary storage data in a straightforward manner.

For instance, in contrast to existing systems, a user can employ certain systems described herein to view and access secondary copy data without having to switch between different applications and user interfaces. According to certain aspects, files in secondary storage are accessible by users via a native file system browser. The user interface and experience can be the same or substantially the same as for accessing primary or production copies of files, and the fact that the file has been accessed from secondary storage can therefore be transparent to the user, e.g., without requiring the use of a specialized interface for accessing data in secondary storage.

In addition, it may be useful to share a portion of a secondary storage file with another user without sharing a full copy of the file. Due to the above challenges, there is a need for a simplified method of browsing, accessing, and/or sharing secondary storage data.

In order to address these and other challenges, certain information management systems disclosed herein are configured to implement partial sharing of a secondary storage file. An information management system according to certain aspects may also provide access to secondary storage files or other data using a native view of secondary storage data. Index data and/or other metadata relating to the secondary storage data can be used to implement such techniques. Index data can include a content index.

The information management system according to certain aspects can allow users to share a portion of a file (e.g., a document) in secondary storage. In many situations where a user wants to share a file with another user, the user does not need to share the entire file. The relevant portions are generally a small percentage of the file. For example, a user may want to share only 2 relevant pages out of a 100-page document. When sharing secondary storage files, the system may provide the functionality of selecting a portion of the file. The user can specify a portion of a secondary storage file to share and send a link to the portion to another user. The receiving user can access the shared portion from the link, and just the shared portion may be restored from secondary storage. Or the shared portion may be available from content index data. In this manner, the system can reduce the amount of resources used in sharing and restoring a secondary storage file.

The information management system according to certain aspects can also provide a native view of secondary storage data on a client computer. A client may store information relating to secondary storage data locally (e.g., on the client machine itself or in the associated information store) so that it may access the information without accessing the secondary storage. Such information may include index data and/or metadata relating to secondary storage data. The index data and/or metadata may be stored in native format (e.g., format of the application(s) that generated the secondary storage data) so that the secondary storage data can be displayed in a native view. For instance, secondary copy files or other data may be accessed with a native file system browser on the client computing device, without using a separate or specialized interface. In this manner, the fact that a user is accessing data from secondary storage rather than primary storage can be transparent to the user. For example, files in secondary storage may be browsed using Windows Explorer on a client computer. The client can synchronize the index data and/or metadata (e.g., periodically) to reflect any updates, without synchronizing the secondary storage data itself. If a user accesses particular data items in the native view, the data items may be restored from secondary storage. In this manner, the system can simplify the process of viewing primary storage data and secondary storage data on a client, and the amount of data actually accessed from secondary storage can be reduced, improving performance.

Where only a portion of the file is accessed for sharing, systems and methods described herein utilize a partial file restore scheme, where a portion of the secondary copy of a file or other data unit is restored instead of the entire secondary copy. Restoring only the desired portion can save a significant amount of time, especially for large files like movie and large document files.

The user may indicate the portion of the secondary copy to restore using an interface of the native application associated with the file. As just one illustrative example, a user drags a playback slider in a graphical user interface (GUI) of a video playback application to begin playing the video at some intermediate point in the video file. The intermediate point corresponds to an application offset which designates the starting position for the portion of the file to be restored. However, while the native application can use the application offsets to access selected portions of files, application offsets may not map to corresponding offsets in the secondary copy of the file. For example, secondary copies may include backup-related metadata (e.g., in a header). In addition, the data for the secondary copy may have been deduplicated, compressed, etc. Accordingly, certain embodiments described herein advantageously map between native application offsets and secondary copy offsets, which can allow for access to selected portions of files stored in secondary storage in a fast and efficient manner.

The information management system according to certain aspects can provide one or more in-chunk indexes that include the mapping information for one or more files. Secondary copies in the system may be stored in logical data units, which may be referred to as "chunks." For instance, secondary copies may be formatted and/or organized as a series of chunks and may be written to secondary storage on a chunk-by-chunk basis. This can facilitate efficient communication and writing to secondary storage. For example, larger chunk sizes can provide better throughput when writing data to secondary storage (e.g., tape media).

Each chunk may have associated metadata information or index files. The in-chunk index for a chunk may be included in the chunk metadata information, or may be an index file associated with the chunk. The in-chunk index can be written to secondary storage with the chunk. The mapping information for a secondary copy can become quite extensive since mapping information can be created for numerous points in the file. Storing the in-chunk index in secondary storage, along with the secondary copy, can provide certain advantages. For instance, this approach can help maintain the sizes of indexes associated with other components in the system (e.g., the storage manager, the media agent, etc.) at manageable levels.

The in-chunk index may include any information relating to mapping between application offsets and secondary copy offsets. For example, the in-chunk index can include a list of application offsets and their corresponding secondary storage offsets. The in-chunk index may also indicate the physical byte position in the chunk that corresponds to the secondary storage offset. A file may span across multiple chunks, and the physical byte position information can facilitate locating the actual byte position for the secondary copy offset in a particular chunk. A chunk can include multiple files, and the in-chunk index may include the mapping information for all the files in the chunk. In such cases, the in-chunk index may also indicate which application offsets belong to which files in the chunk.

The in-chunk index may be created and stored while performing a storage operation, such as a backup or an archive operation, and can be accessed at the time of restore in order to find the corresponding secondary copy offset for the user selected application offset. As mentioned above, the user can indicate one or more application offsets for the portion of the file to be restored (e.g., via the application user interface). The mapping information between the application offsets and the secondary copy offsets may not be provided at a fixed interval (e.g., due to the dynamic nature of amount of data written to a buffer during a storage operation). Accordingly, the system may perform a search through various application offsets in the in-chunk index to locate the corresponding secondary copy offset. Various search techniques may be used, including a binary search.

The in-chunk index can be provided at a desired level of granularity depending on the requirements of the system. However, the in-chunk index may not include the exact application offset selected by the user. In such cases, the search through the in-chunk index may locate the nearest secondary copy offset (e.g., the application offset prior to the user selected application offset). The system can provide information about the actual restore application offset so that the application can be aware that the restored portion does not start exactly from the user selected application offset.

In this manner, the information management system according to certain aspects can restore a portion of a secondary storage file in a fast and efficient manner. By providing mapping information between application offsets and secondary copy offsets, the system can quickly locate the corresponding or nearest secondary copy offset for the user selected application offset. Using the in-chunk index, the system can provide a fast response time for the restore and a positive user experience. In addition, the mapping information may be stored in secondary storage, which can reduce the amount of data included in the storage manager index, media manager index, etc. By allowing partial file restore, the system may reduce the amount of time and resources for restoring files from secondary storage.

According to some embodiments, a method of sharing a portion of a file in secondary storage. The method may include receiving a request to share a portion of a file in a secondary storage subsystem from a client computing device residing in a primary storage subsystem, the request including at least one application offset generated in response to user selection of the portion of the file, the at least one application offset corresponding to the portion of the file and usable by a software application to access the portion of the file for presentation to a user. The method may also include identifying, with computer hardware and using the at least one application offset, a start secondary storage offset of the file, the start secondary storage offset separate from the application offset and corresponding to a location of the portion of the file on a first storage device residing in the secondary storage subsystem. The method can also include generating, using computer hardware, a link to the portion of the file, the link including a reference to the start secondary storage offset. The method can additionally include, in response to receipt of an indication of a user selection of the link, causing a restore of the portion of the file from the first storage device for presentation to a user of the portion of the file by the software application, without restoring the entire file from the first storage device.

According to certain embodiments, a data storage system configured to share a portion of a file in secondary storage is provided. The system may include a first storage device residing in a secondary storage subsystem and storing a plurality of files including a first file. The system may also include computer hardware configured to execute instructions. The instructions may cause the computer hardware to receive a request to share a portion of the first file from a client computing device residing in a primary storage subsystem, the request including at least one application offset generated in response to user selection of the portion of the first file, the at least one application offset corresponding to the portion of the first file and usable by a software application to access the portion of the first file for presentation to a user. The instructions may further cause the computer hardware to identify, using the at least one application offset, a start secondary storage offset of the first file, the start secondary storage offset separate from the application offset and corresponding to a location of the portion of the first file on the first storage device. The instructions can also cause the computer hardware to generate a link to the portion of the first file, the link including a reference to the start secondary storage offset. The instructions can additionally cause the computer hardware to, in response to receipt of an indication of a user selection of the link, causing a restore of the portion of the first file from the first storage device for presentation to a user of the portion of the first file by the software application, without restoring the entire first file from the first storage device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Systems and methods are described herein for partial sharing of files in secondary storage and providing native views of secondary storage data. Examples of such systems and methods are discussed in further detail herein, e.g., with respect to FIGS. 6-10. Systems and methods are described herein for partial restore of secondary storage files. Examples of such systems and methods are discussed in further detail herein, e.g., with respect to FIGS. 2-5, and are compatible with and can be used in performing the partial sharing techniques described herein.

Moreover, it will be appreciated partial file restore may be implemented by information management systems such as those that will now be described with respect to FIGS. 1A-1H. And, as will be described, the componentry for implementing partial file restore can be incorporated into such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
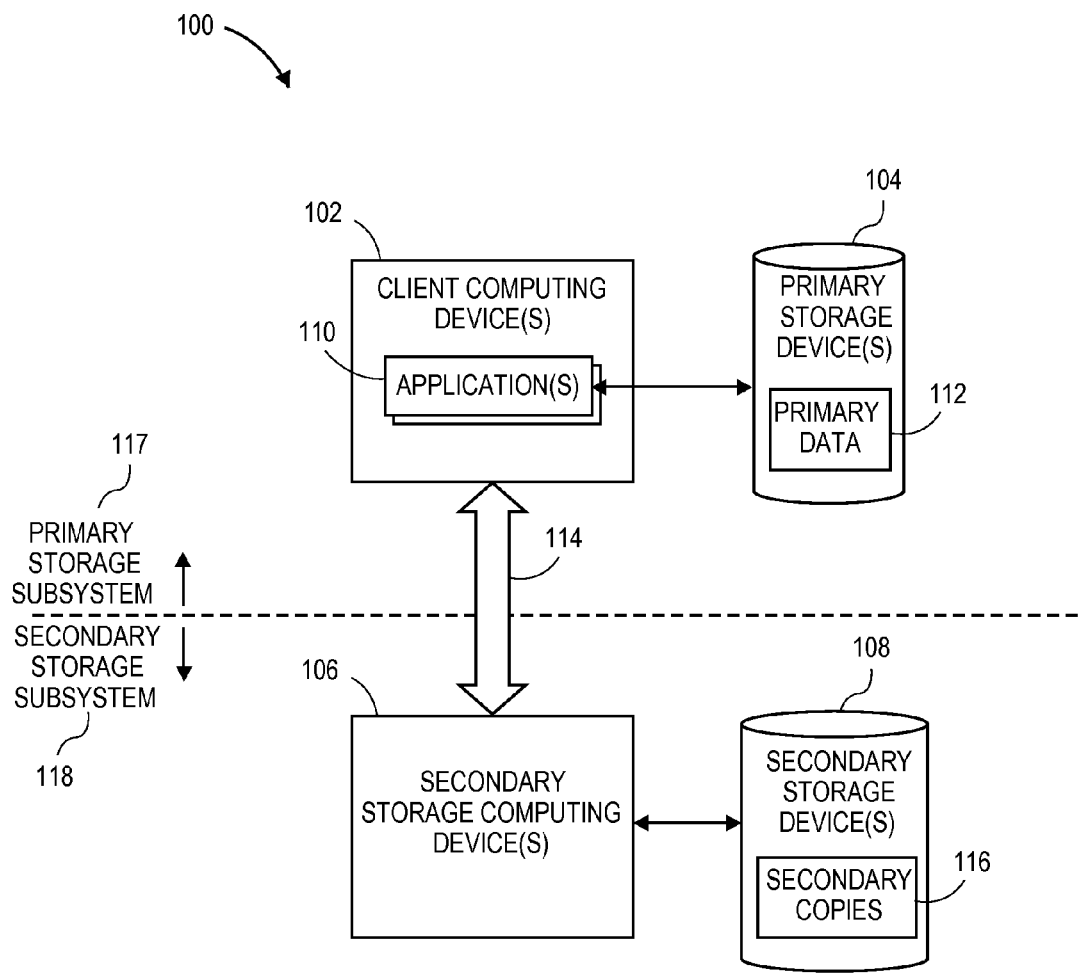
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 7,035,880, entitled "Modular Backup and Retrieval System Used in Conjunction With a Storage Area Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,246,207, entitled "System and Method for Dynamically Performing Storage Operations in a Computer Network";

U.S. Pat. No. 7,747,579, entitled "Metabase for Facilitating Data Classification";

U.S. Pat. No. 8,229,954, entitled "Managing Copies of Data";

U.S. Pat. No. 7,617,262, entitled "System and Methods for Monitoring Application Data in a Data Replication System";

U.S. Pat. No. 7,529,782, entitled "System and Methods for Performing a Snapshot and for Restoring Data";

U.S. Pat. No. 8,230,195, entitled "System And Method For Performing Auxiliary Storage Operations";

U.S. Pat. No. 7,315,923, entitled "System And Method For Combining Data Streams In Pipelined Storage Operations In A Storage Network";

U.S. Pat. No. 8,364,652, entitled "Content-Aligned, Block-Based Deduplication";

U.S. Pat. Pub. No. 2006/0224846, entitled "System and Method to Support Single Instance Storage Operations";

U.S. Pat. Pub. No. 2010/0299490, entitled "Block-Level Single Instancing";

U.S. Pat. Pub. No. 2009/0319534, entitled "Application-Aware and Remote Single Instance Data Management";

U.S. Pat. Pub. No. 2012/0150826, entitled "Distributed Deduplicated Storage System";

U.S. Pat. Pub. No. 2012/0150818, entitled "Client-Side Repository in a Networked Deduplicated Storage System";

U.S. Pat. No. 8,170,995, entitled "Method and System for Offline Indexing of Content and Classifying Stored Data";

U.S. Pat. No. 7,107,298, entitled "System And Method For Archiving Objects In An Information Store";

U.S. Pat. No. 8,230,195, entitled "System And Method For Performing Auxiliary Storage Operations";

U.S. Pat. No. 8,229,954, entitled "Managing Copies Of Data"; and

U.S. Pat. No. 8,156,086, entitled "Systems And Methods For Stored Data Verification".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, *Lotus* Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
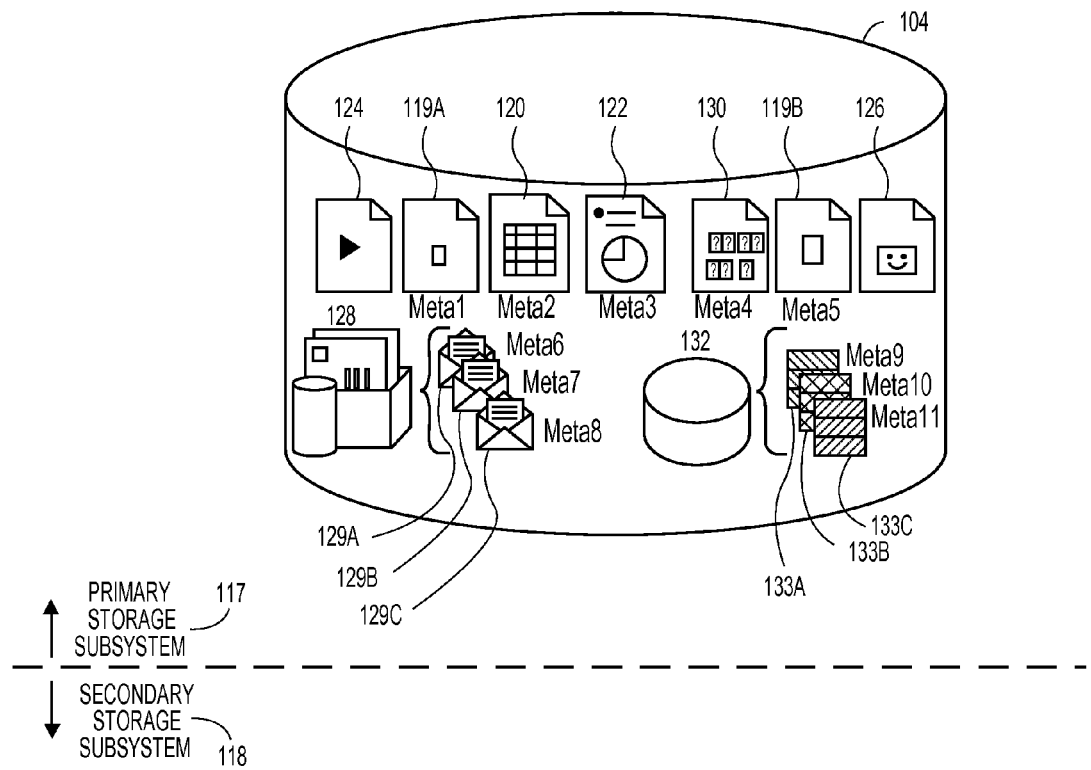
FIG. 1B is a detailed view of a primary storage device, a secondary storage device, and some examples of primary data and secondary copy data.
Figure 1B:
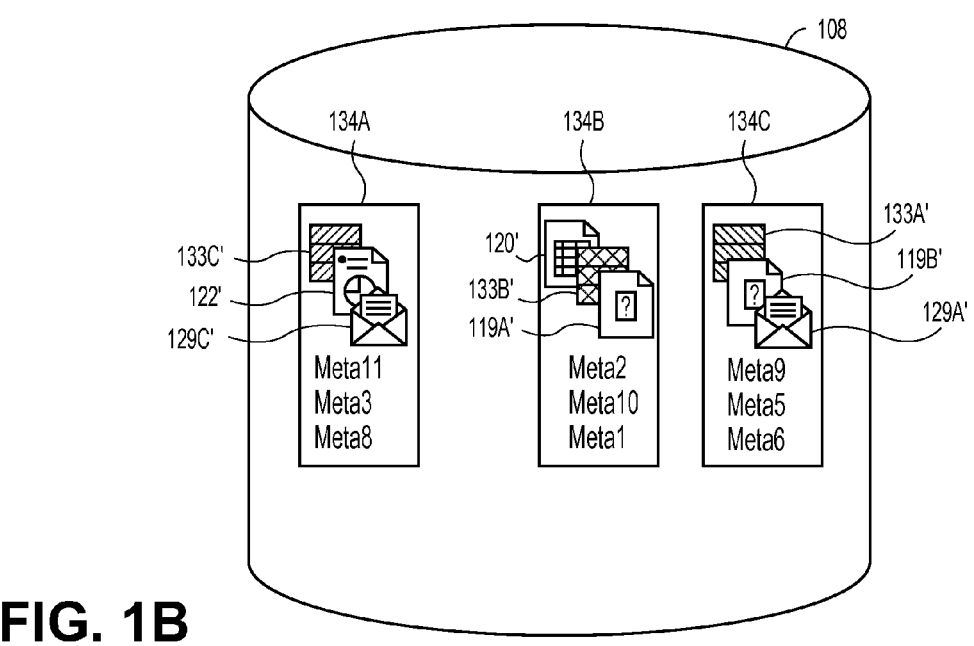

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
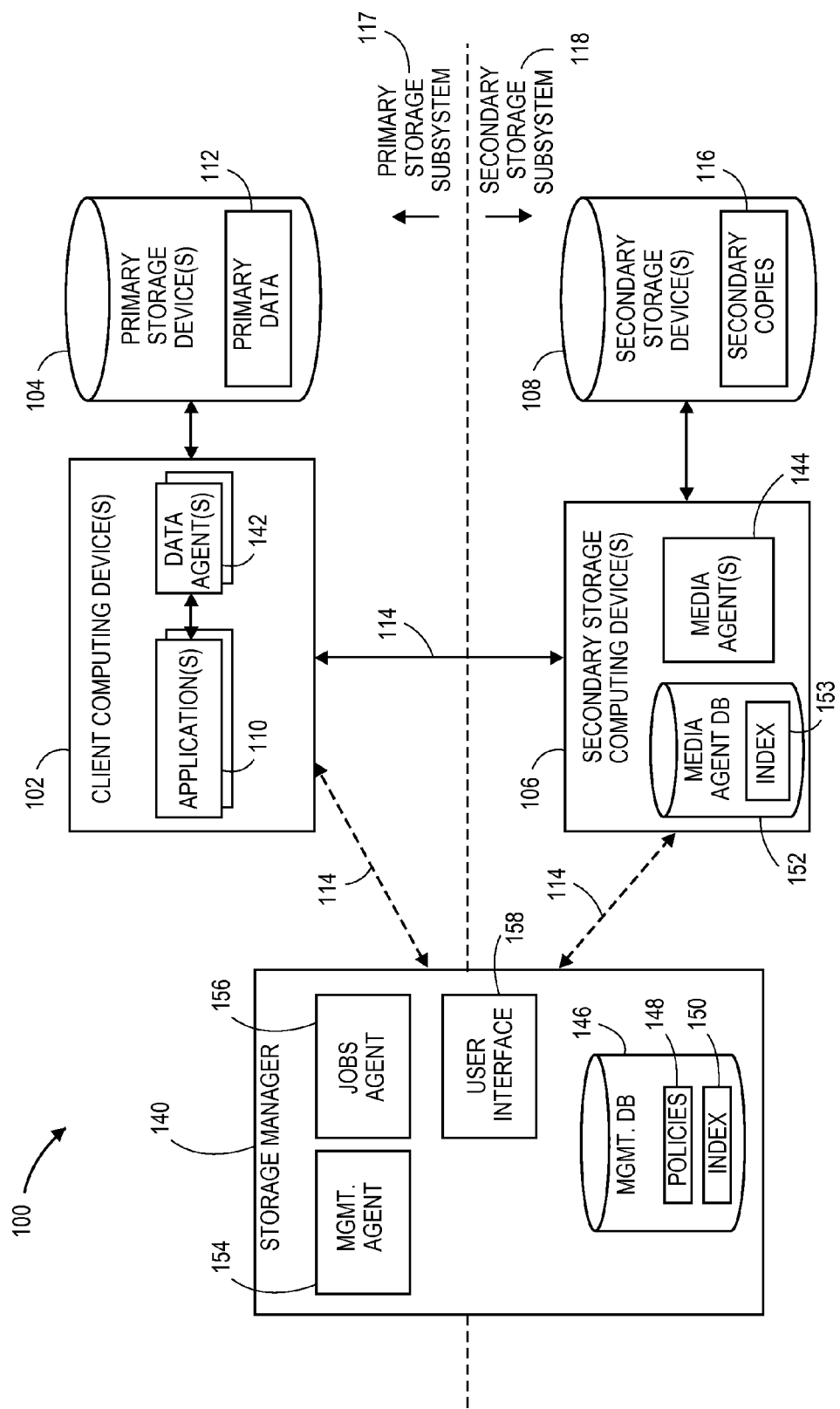
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata.

As shown by the dashed arrowed lines 114, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An information management "cell" may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the database 146 is relatively large, the database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
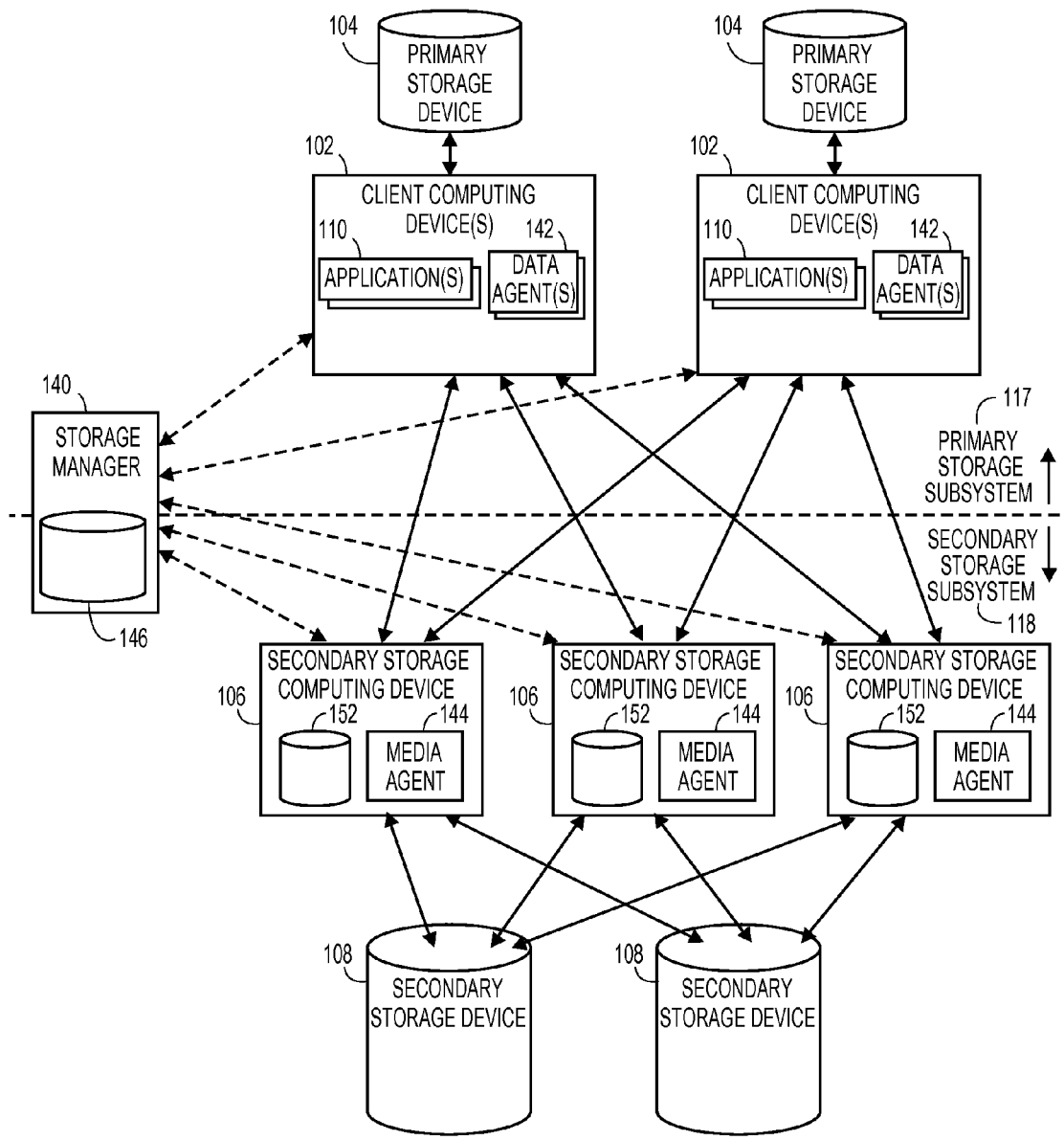
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing platform, e.g., between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, using hardware snapshots can off-load processing involved in snapshot creation and management from other components in the system 100.

A "software" snapshot operation, on the other hand, can be a snapshot operation in which one or more other components in the system (e.g., the client computing devices 102, data agents 142, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to further leverage the data stored in the information management system 100 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components. For instance, there may be a dedicated metabase associated with some or all of the client computing devices 102 and/or media agents 144. In some embodiments, a data classification database may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;
  the type of copy 116 (e.g., type of secondary copy) and/or copy format (e.g., snapshot, backup, archive, HSM, etc.);
  a location or a class or quality of storage for storing secondary copies 116 (e.g., one or more particular secondary storage devices 108);
  preferences regarding whether and how to encrypt, compress, deduplicate, or otherwise modify or transform secondary copies 116;
  which system components and/or network pathways (e.g., preferred media agents 144) should be used to perform secondary storage operations;
  resource allocation between different computing devices or other system components used in performing information management operations (e.g., bandwidth allocation, available storage capacity, etc.);
  whether and how to synchronize or otherwise distribute files or other data objects across multiple computing devices or hosted services; and
  retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;
  time-related factors (e.g., aging information such as time since the creation or modification of a data object);
  deduplication information (e.g., hashes, data blocks, deduplication block size, deduplication efficiency or other metrics);
  an estimated or historic usage or cost associated with different components (e.g., with secondary storage devices 108);
  the identity of users, applications 110, client computing devices 102 and/or other computing devices that created, accessed, modified, or otherwise utilized primary data 112 or secondary copies 116;
  a relative sensitivity (e.g., confidentiality) of a data object, e.g., as determined by its content and/or metadata;
  the current or historical storage capacity of various storage devices;
  the current or historical network capacity of network pathways connecting various components within the storage operation cell;
  access control lists or other security information; and
  the content of a particular data object (e.g., its textual content) or of metadata associated with the data object.

Exemplary Storage Policy and Secondary Storage Operations

Figure 1E:
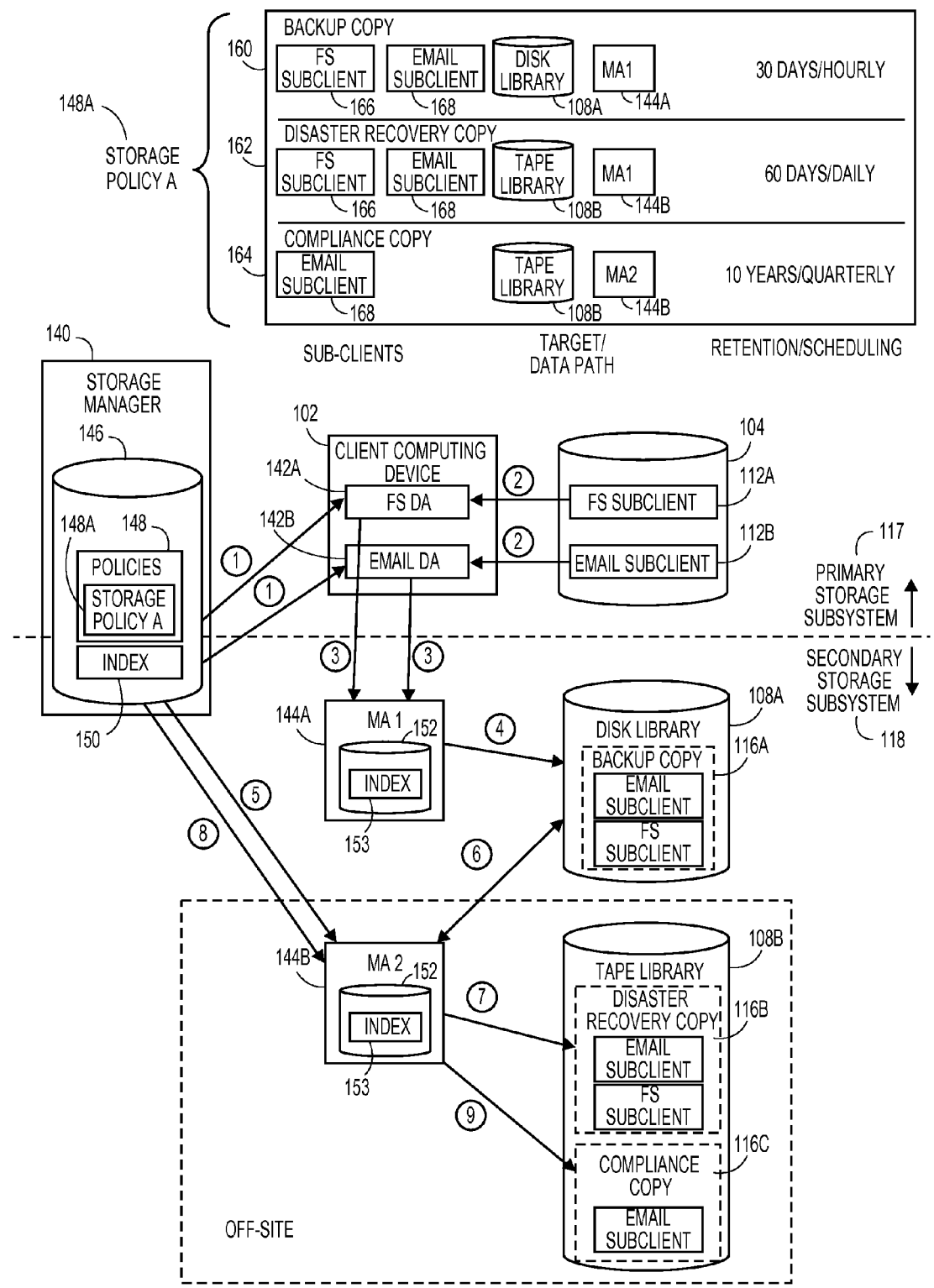
FIG. 1E illustrates certain secondary copy operations according to an exemplary storage policy.

FIG. 1E shows a data flow data diagram depicting performance of storage operations by an embodiment of an information management system 100, according to an exemplary storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010/0299490, each of which is incorporated by reference herein.

Figure 1F:
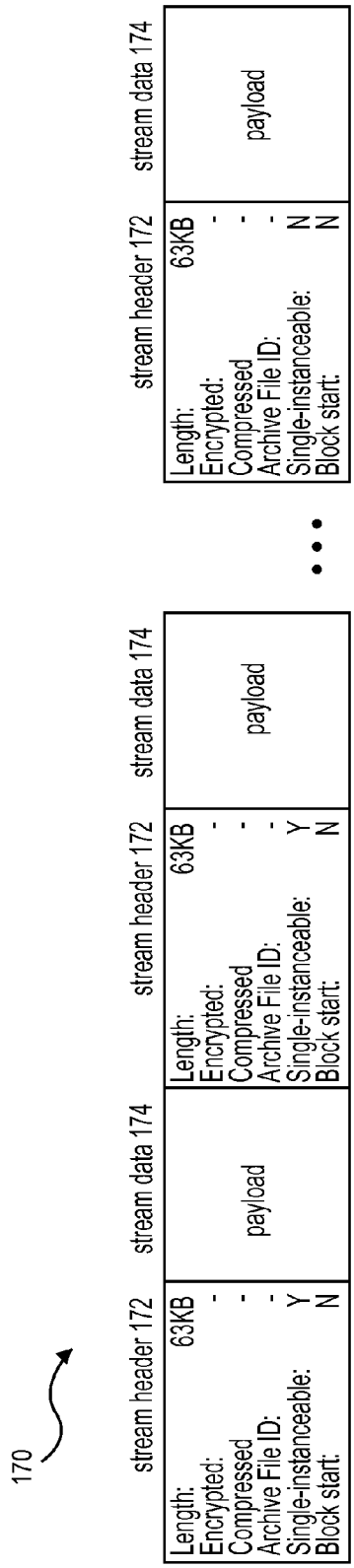
FIGS. 1F-1H are block diagrams illustrating suitable data structures that may be employed by the information management system.
Figure 1G:
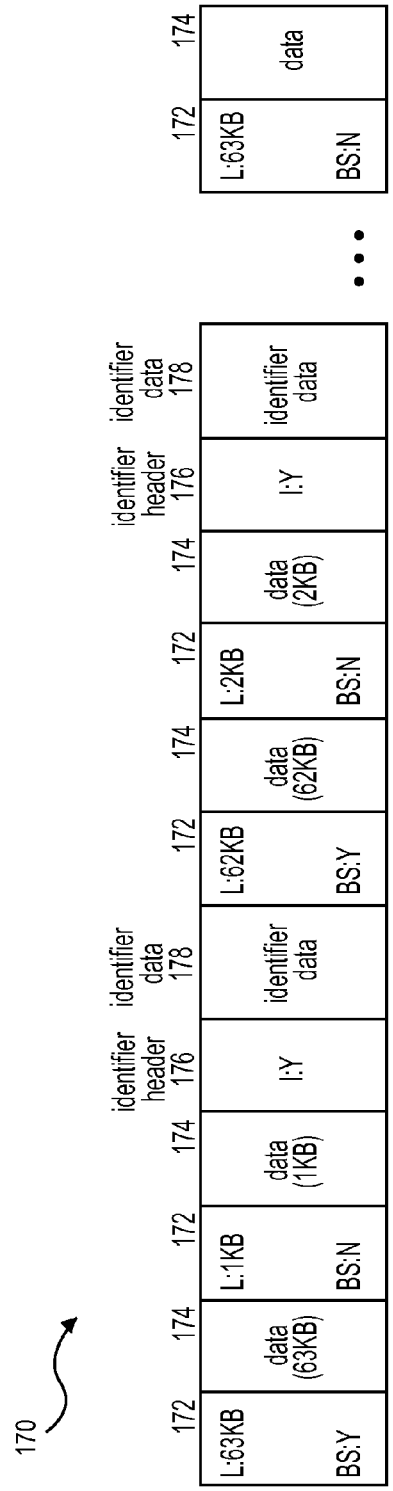

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
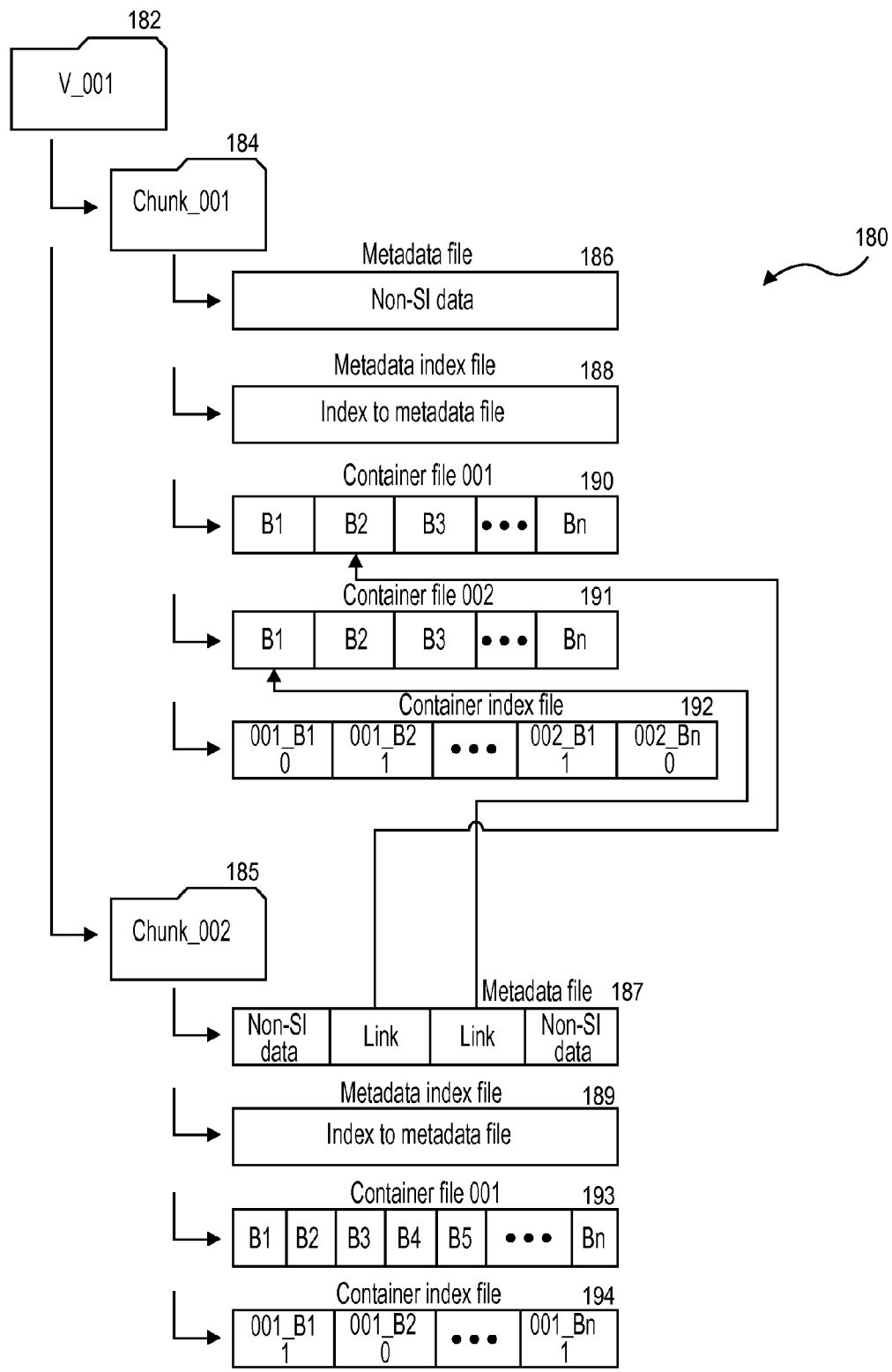

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

System Overview

The systems and methods described with respect to FIGS. 1A-1H can be used for file sharing, including for restoring and/or sharing portions of files. In some embodiments, a partial file restore module is a software module that forms a part of or resides on the storage manager 140 or, alternatively, the media agents 144. The partial file restore module can additionally be a software module executing on one or more of the client computers 102. For instance, in some embodiments, the partial file restore module may be implemented as a part of the data agent 142. Partial file restore will be discussed in more detail with respect to FIGS. 2-5.

Figure 2:
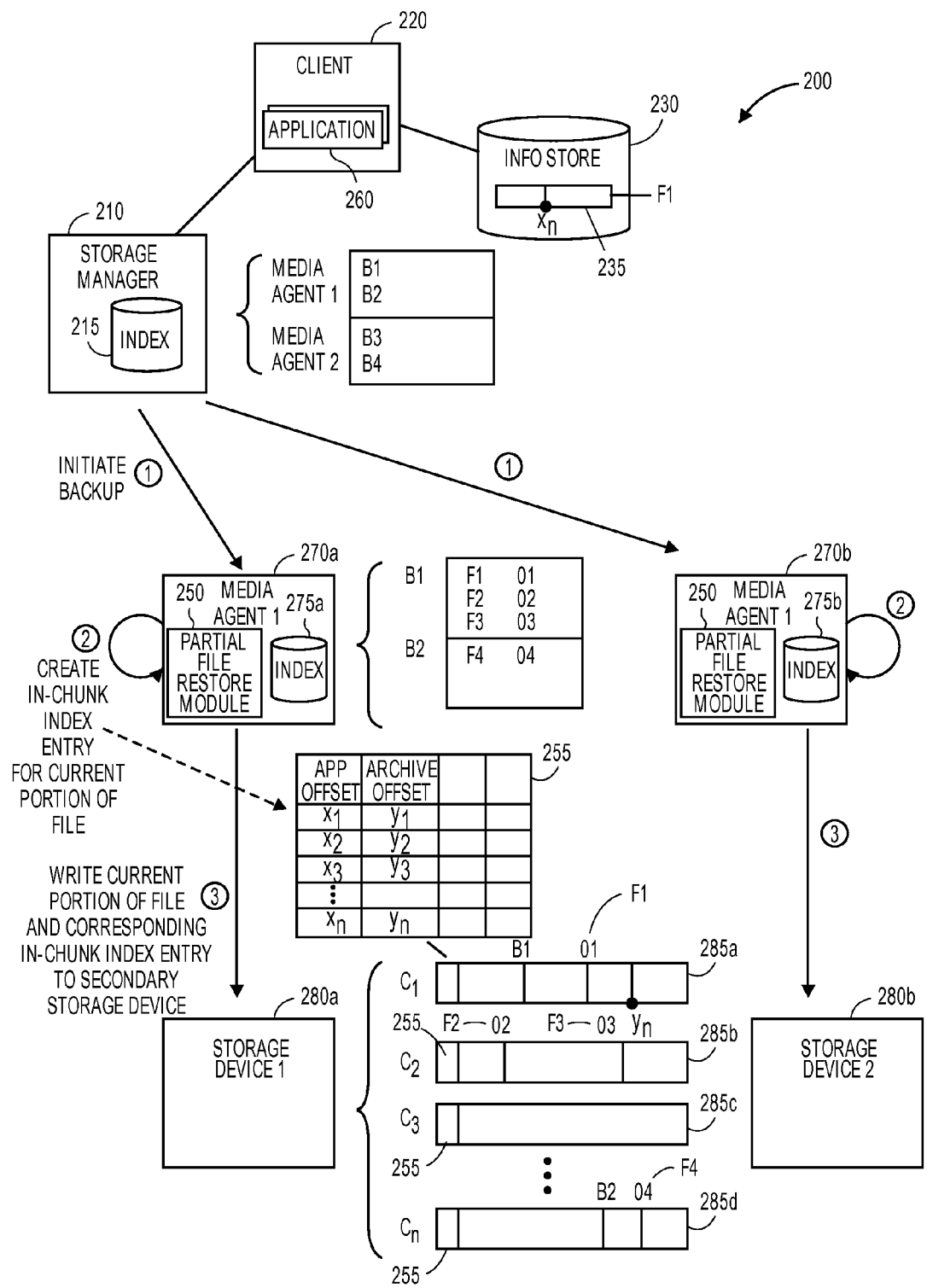
FIG. 2 is a data flow diagram illustrative of the interaction between the various components of an exemplary information management system configured to implement an in-chunk index for partial file restore, according to certain embodiments.

An Exemplary Information Management System for Implementing Partial File Restore FIG. 2 is a data flow diagram illustrative of the interaction between the various components of an exemplary information management system 200 configured to implement an in-chunk index for partial file restore, according to certain embodiments. As illustrated, the exemplary information management system 200 includes a storage manager 210, a client 220, an information store 230, one or more partial file restore modules 250, one or more applications 260, one or more media agents 270, and one or more secondary storage devices 280. The system 200 and corresponding components of FIG. 2 may be similar to or the same as the system 100 and similarly named components of FIG. 1D. Moreover, depending on the embodiment, the system 200 of FIG. 2 may additionally include any of the other components shown in FIG. 1D that are not specifically shown in FIG. 2 (e.g., one or more data agents, etc.). The system 200 may include one or more of each component. All components of the system 200 can be in direct communication with each other or communicate indirectly via the client 220, the storage manager 210, the media agent 270, or the like. In certain embodiments, some of the components in FIG. 2 shown as separate components can reside on a single computing device, or vice versa. For example, the partial file restore module 250 can be on the media agent 270 or on a separate computing device.

With further reference to FIG. 2, the interaction between the various components of the exemplary information management system will now be described in greater detail with respect to data flow steps indicated by the numbered arrows.

Files in primary storage may be copied to secondary storage, e.g., as part of a backup, archive, or other secondary copy operation. The copies of files in secondary storage may be referred to as secondary copies of the files. Partial file restore may refer to restoring a portion of a secondary copy of a file, instead of restoring the entire secondary copy. In many cases, only a portion of the secondary copy may be needed. For example, the user may select a video file for playback, where the video file resides in secondary storage. But the user may want to start watching from a certain point into the movie. In such a case, restoring only the desired portion of the secondary copy can save a significant amount of time, especially for large files like video files.

The user may indicate the portion of the secondary copy to restore using an interface of the native application associated with the file. For example, in case of a video file, the user may drag the playback slider in the graphical user interface (GUI) of a video playback application to a particular point from which the user wishes to view the video. The application can determine the application offset that corresponds to the point selected by the user in the GUI, and the application offset can designate the starting position for the portion of the file to be restored. The application may indicate the application offset for the starting point of the portion, or indicate the application offsets for both the starting point and end point of the portion. However, application offsets may not map to corresponding offsets in the secondary copy. For instance, secondary copies may include backup-related metadata at the beginning, e.g., in the header. In addition, the data for the secondary copies may have been deduplicated, compressed, etc. Therefore, there is a need for mapping the application offsets to the secondary copy offsets in an easily accessible and efficient manner. The system 200 can provide one or more in-chunk indexes that include information about the mapping between the application offsets and the secondary copy offsets.

As explained above, a "chunk" may refer to logical data units in which secondary copies are stored. Secondary copies may be formatted and/or organized as a series of chunks, and may be written to secondary storage on a chunk-by-chunk basis. The chunk size can be defined according to the requirements of the system 200 (e.g., 512

MB, 1 GB, 2 GB, 4 GB, or 8 GB chunks). Formatting secondary copies in chunks can facilitate efficient communication and writing to secondary storage devices. For example, a larger chunk size can provide better throughput when writing data to secondary storage (e.g., tape media). A chunk may include multiple files, and a file may span across multiple chunks. FIG. 2 illustrates chunks $C_1$ through $C_n$ 285 in Storage Device 1 280a. As shown, chunk $C_2$ 285b includes multiple files (files F1 and F2). File F3 spans across multiple chunks. File F3 starts in chunk $C_2$ 285b, and continues through chunk $C_3$ 285c and one or more subsequent chunks (not shown). Chunks are explained in more detail above.

Each chunk may have associated metadata information or index files. An in-chunk index can include the mapping information between the application offsets and secondary copy offsets for one or more files. The in-chunk index may be included in the chunk metadata information, or may be an index file associated with the chunk. In-chunk indexes will be explained in more detail with respect to data flow step 2.

At data flow step 1, the storage manager 210 initiates backup of primary storage data to secondary storage. The backup (or other secondary copy operation) may run according to a schedule, at user request, based on a storage policy such as any of the storage policies described herein, based on certain events, etc. A schedule may be based on the passage of a pre-determined amount of time, such as on a regular basis (e.g., after a particular time interval, such as a certain number of hours or days), or on an intermittent basis. Backup may also be event-based and may be triggered by certain events. Backup can be implemented as one or more storage policies, and the storage manager 210 may manage such storage policies. In some embodiments, the system 200 may provide partial file restore feature as an option during backup. For example, the system administrator may select partial file restore as one of the backup parameters, causing the system 200 to create an in-chunk index in the backup copy to enable later partial file recovery.

The storage manager 210 may instruct one or more media agents 270 to copy the data from primary storage (e.g., information store 230) to secondary storage (e.g., storage devices 280). A media agent 270 may write data to a buffer in order to copy the data to secondary storage. The buffer may have a fixed size. The buffer size can be selected based on the bandwidth and other requirements of the system 200 (e.g., 64 KB, etc.). The amount of data written to the buffer can vary depending on each write operation. For instance, the amount of data that is written in a write operation can range anywhere from greater than 0 to the size of the buffer. Accordingly, the amount of data written to the buffer can be dynamic and indeterminate. Moreover, as will be described further, mapping entries in the in-chunk index are generally written to the chunk for a given portion of the file at the time that portion is written to the secondary storage device using the buffer. It can be important that the mapping entries (e.g., application offset/secondary copy offset pairs) are stored at the time of the corresponding buffer write. For example, it would be difficult or impractical to determine the correct mapping information at a later point in time, after one or more subsequent buffer writes, due to the indeterminate nature of the buffer write size.

The storage manager 210 and/or the media agents 270 may store information relating to the backup in their respective indexes 215, 275. For example, the storage manager index 215 can include information about which backup copies and/or operations are associated with which media agents 270. In FIG. 2, a first backup B1 and a second backup B2 are associated with Media Agent 1 270a, and a third backup B3 and a fourth backup B4 are associated with Media Agent 2 270b. The media agent index(es) 275 can include information about which files are associated with which backup copies and/or operations and any related information (e.g., beginning offset of a file in a backup copy). In FIG. 2, the index 275a for Media Agent 1 270a indicates that files F1, F2, and F3 are associated with backup B1, and that file F4 is associated with backup B2. The media agent index 275a also includes information about the beginning offset of each file in the backup copy, e.g., the location in the backup copy at which the particular file begins. For instance, file F1 in backup B1 begins at offset 01; file F2 in backup B1 begins at offset 02; file F3 in backup B1 begins at offset 03; and file F4 in backup B2 begins at offset 04.

The media agents 270 may copy and store the data in the storage devices 280 in chunks 285. In FIG. 2, files F1, F2, F3, and F4 are stored in various chunks 285 (e.g., chunks $C_1$ through $C_n$). File F1 starts in chunk $C_1$ 285a and ends in chunk $C_2$ 285b; file F2 starts and ends in chunk $C_2$ 285b; file F3 starts in chunk $C_2$ 285b and continues through at least chunk $C_3$ 285c; and file F4 starts in chunk $C_n$ 285d. A chunk 285 can contain multiple files like chunks $C_1$ 285a, $C_2$ 285b, and $C_n$ 285d. Or a chunk 285 can contain one file like chunk $C_3$ 285c. A file can be stored in one chunk 285 like file F2, or can be stored in multiple chunks 285 like files F1 and F3. As shown in FIG. 2, a backup copy can be stored in multiple chunks 285. For instance, data for backup B1 is stored in chunks $C_1$, $C_2$, $C_3$ through $C_n$ 285.

At data flow step 2, the partial file restore module 250 creates the in-chunk index 255 entry for the current portion of a file being processed. The partial file restore module 250 creates one or more in-chunk indexes 255 for files that are being copied to secondary storage. As explained above, the in-chunk index 255 entry for the current portion of the file may be written to secondary storage at the time the portion of the file is written to secondary storage.

The partial file restore module 250 may be a part of or associated with a media agent 270. The partial file restore module 250 creates the in-chunk index(es) 255, for example, during a backup. While described with respect to a backup copy operation for the purposes of illustration, the techniques described herein are compatible with other types of storage operations, such as, for example, replication, snapshots, archiving and the like. A description of these and other storage operations compatible with embodiments described herein is provided above. For example, the in-chunk index 255 may be created during archiving, instead of a backup.

As mentioned above, the application offsets for a file may not map exactly to corresponding secondary copy offsets. Secondary copies can include backup related metadata and/or header information, and data for secondary copies may be deduplicated and/or compressed during backup. Therefore, the corresponding offset in the secondary copy may not be easily calculated or determined, and locating the corresponding offset can become complicated. Accordingly, the system 200 may provide a mapping between application offsets and the corresponding secondary copy offsets. Such mapping information can be especially useful for locating particular positions in large files. To allow for granular access, the mapping information may include the application offset and the corresponding secondary copy offset at various points throughout the file, at a selected frequency (e.g., every N bytes).

The mapping information for a file can be included in an in-chunk index 255 for the chunk 285 the file is stored in. As explained above, a chunk 285 may include metadata information and/or index files associated with the chunk 285. The in-chunk index 255 may be a part of the metadata information and/or may be one or more index files for the chunk 285. The in-chunk index 255 for a chunk 285 can be written to storage devices 280 with the chunk 285, e.g., as part of the chunk metadata information or as a chunk index file(s). The mapping information for a secondary copy can become quite extensive since mapping can be created for a number of points in the file. By storing the in-chunk index 255 in-chunk on the secondary storage devices 280, the system 200 can advantageously maintain the storage manager index 215 and/or the media agent index(es) 275 at manageable sizes.

In some embodiments, the in-chunk index 255 may be stored in the storage manager index 215 and/or the media agent index(es) 275, in addition to and/or instead of storing in storage devices 280 with the chunk 285 itself. For example, some or all of the in-chunk index 255 may be accessible in the storage manager index 215 and/or the media agent index(es) 275, e.g., for faster searching within certain files.

The in-chunk index 255 can include the mapping information for all files in the chunk 285. For example, in FIG. 2, the in-chunk index 255 for chunk $C_1$ 285a can include the mapping information for file F1 as well as any other files in chunk $C_1$ 285a. The in-chunk index 255 may be stored in one in-chunk index file. In some embodiments, a separate in-chunk index 255 can be created for each file in the chunk 285, and the in-chunk index 255 for the different files may be stored in separate in-chunk index files.

If a file is stored across multiple chunks 285 (e.g., files F1 and F3), each chunk 285 that stores a portion of the file may include mapping information for that portion of the file in its in-chunk index 255. In FIG. 2, for file F1, the in-chunk index 255 for chunk $C_1$ 285a can include mapping information for the portion of file F1 stored in chunk $C_1$ 285a, and the in-chunk index 255 for chunk $C_2$ 285b can include mapping information for the portion of file F1 stored in chunk $C_2$ 285b. Similarly, for file F3, chunk $C_2$ in-chunk index 255 can include the mapping information for the portion of file F3 in chunk $C_2$ 285b, chunk $C_3$ in-chunk index 255 can include the mapping information for the portion of file F3 in chunk $C_3$ 285c, and so forth.

If a file spans across multiple chunks 285, the media agent index 275 may include information about which part of the file is stored in which chunk 285. For example, the media agent index 275 may indicate, for each chunk 285, the beginning application offset for the part of the file in the chunk 285 such that the system 200 can easily determine which chunk 285 should be accessed to find the portion of the file to be restored.

An in-chunk index 255 can include any information relating to mapping application offsets for a file to secondary copy offsets for the file. The in-chunk index 255 may be structured in many different ways. In an illustrative example, FIG. 2 shows the in-chunk index 255 as including various application offsets and corresponding secondary copy offsets. Secondary copy offsets may also be referred to as "archive offsets" as shown in FIG. 2, depending on the embodiment. If the in-chunk index 255 includes the mapping for all files in the chunk 285, the in-chunk index 255 may also provide information regarding which application offsets relate to which files in the chunk 285. For example, the in-chunk index 255 in FIG. 2 can have an additional column indicating the file to which the application offsets belong. In some embodiments, the system 200 may provide another index that includes information about the location of the starting application offset record and the end application offset record within the in-chunk index 255 for different files in the chunk 285.

Although not shown in FIG. 2, the in-chunk index 255 may also include the physical byte position in the chunk 285 that corresponds to the secondary copy offset. By including the physical chunk byte information, the system 200 can directly access the actual byte position for the secondary copy offset. This may be especially helpful when a file is stored across multiple chunks 285, and the secondary copy offset may not indicate directly where the point is located within the current chunk 285.

The granularity at which the mapping entries are included in the in-chunk index 255 may be set according to the requirements of the system 200. As an example, mapping entries in the in-chunk index 255 may be provided for at least every 1 MB. The granularity can become more refined by selecting a smaller interval, but the size of the mapping information would increase accordingly. The interval at which the mapping information is provided may not be a fixed interval. As explained with respect to data flow step 1, the media agents 270 may write data to the buffer when copying the data from primary storage to secondary storage, and the amount of data written to the buffer may differ from one write operation to the next write operation when iteratively writing the chunks with multiple buffer writes. Because of the dynamic nature of the amount of data that may be written to the buffer during each write, the mapping entries may not be created at fixed intervals (e.g., at every 1 MB). Thus, the interval may be irregular and may not be predictable (e.g., from between 1 MB and N MB for any given buffer write).

Respective application offsets and/or respective secondary file offsets (archive offsets) may be spaced from one another by the size of the interval. As an example, a first mapping entry of an in-chunk index 255 for a particular file has an application offset of 100 MB (and an archive offset of 500 MB). A 4 MB chunk of the file is written to the chunk the next interval. Thus, the next mapping entry written to the in-chunk index 255 includes an application offset of 104 MB, and an archive offset of 504 MB). In other embodiments, the application offset and/or archive offset for the next entry do not increase by exactly 4 MB, due to compression, embedded metadata or encryption information, or the like. For instance, the next entry may include an application offset of 104 MB, but an archive offset of 503 MB, where compression is applied to the secondary copy of the file.

In FIG. 2, the in-chunk index 255 illustrates mapping information for file F1. As mentioned above, an in-chunk index 255 can include the mapping information for all files in the chunk 285. The in-chunk index 255 in FIG. 2 includes application offsets and corresponding archive offsets. For example, application offset $x_1$ corresponds to archive offset $y_1$; application offset $x_2$ corresponds to archive offset $y_2$; application offset $x_3$ corresponds to archive offset $y_3$; and application offset $x_n$ corresponds to archive offset $y_n$. Application offset $x_n$ corresponds to point $x_n$ indicated in file F1 235 in the information store 230. As explained above, the interval between application offsets may not be fixed. For example, the interval between application offset $x_1$ and application offset $x_2$ may be different from the interval between application offset $x_2$ and application offset $x_3$. In addition, the interval between archive offsets may not be fixed. For example, the interval between archive offset $y_1$ and archive offset $y_2$ may be different from the interval between archive offset $y_2$ and archive offset $y_3$. The interval between archive offsets may vary due to compression, deduplication, etc.

At data flow step 3, the media agent 270 writes the current portion of the file and the corresponding in-chunk index 255 entry to the secondary storage device 280. As mentioned above, the in-chunk index 255 can be copied to the storage devices 280 as a part of the chunk metadata and/or as a chunk index file(s). In this manner, the amount of information in the storage manager index 215 and/or the media agent index(es) 275 can be maintained at a manageable level. The system 200 can repeat data flow steps 2 and 3 for each buffer write until the backup is complete.

Figure 3:
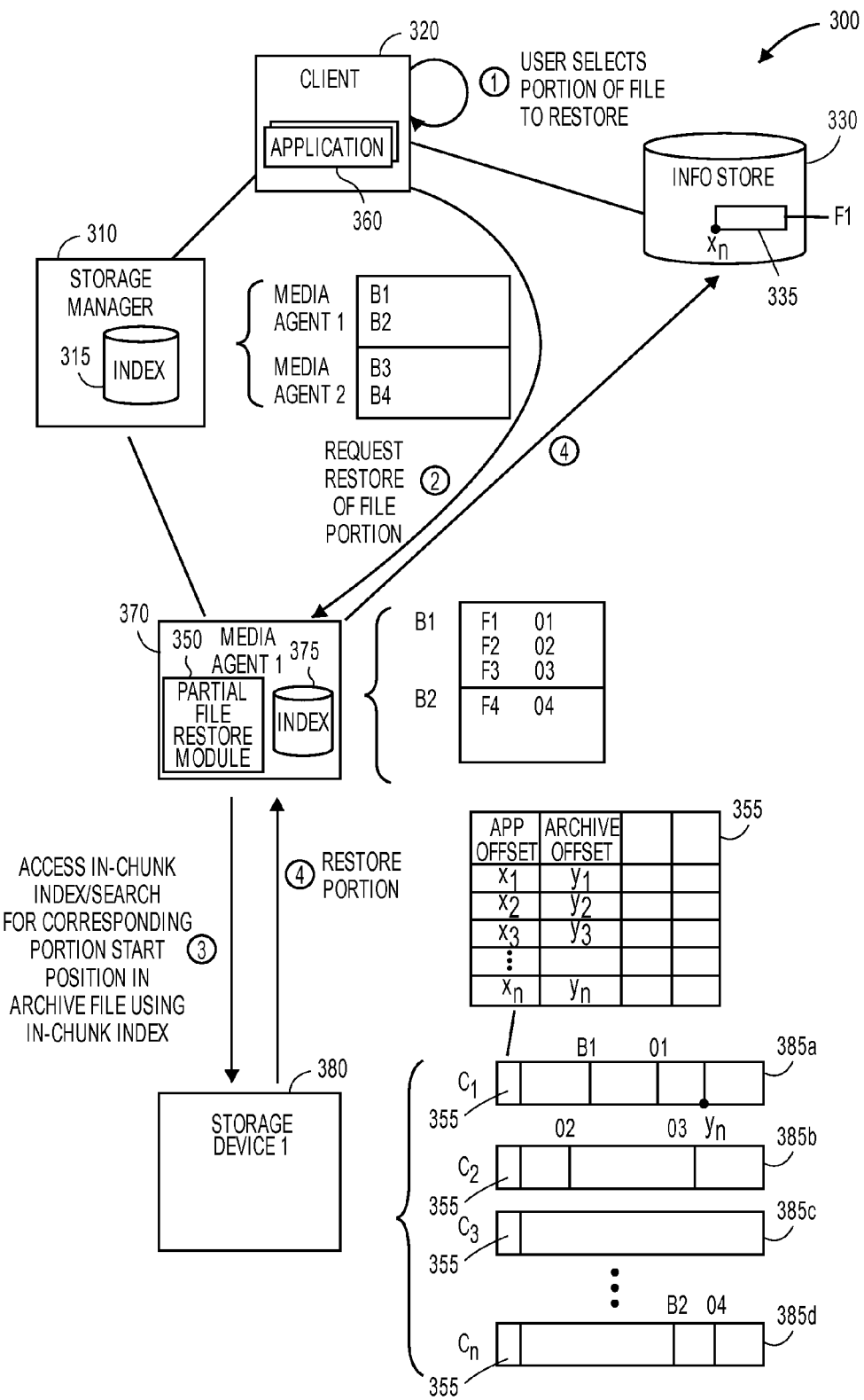
FIG. 3 is a data flow diagram illustrative of the interaction between the various components of another exemplary information management system configured to implement partial file restore, according to certain embodiments.

FIG. 3 is a data flow diagram illustrative of the interaction between the various components of another exemplary information management system 300 configured to implement partial file restore, according to certain embodiments. As illustrated, the exemplary information management system 300 includes a storage manager 310, a client 320, an information store 330, one or more partial file restore modules 350, one or more applications 360, a media agent 370, and one or more secondary storage devices 380. The system 300 and corresponding components of FIG. 3 may be similar to or the same as the system 100, 200 and similarly named components of FIGS. 1D and 2. Moreover, depending on the embodiment, the system 300 of FIG. 3 may additionally include any of the other components shown in FIG. 1D that are not specifically shown in FIG. 3 (e.g., one or more data agents, etc.). The system 300 may include one or more of each component. All components of the system 300 can be in direct communication with each other or communicate indirectly via the client 320, the storage manager 310, the media agent 370, or the like. In certain embodiments, some of the components in FIG. 3 shown as separate components can reside on a single computing device, or vice versa. For example, the partial level restore module 350 can be on the media agent 370 or on a separate computing device.

With further reference to FIG. 3, the interaction between the various components of the exemplary information management system will now be described in greater detail with respect to data flow steps indicated by the numbered arrows.

At data flow step 1, the user selects a portion of a file to restore using partial file restore, e.g., at a client 320. The user may browse the files that have been moved or copied to secondary storage via a user interface. For instance, the user interface may be a file browsing interface (e.g., Windows Explorer) provided by the operating and/or file system executing on the client device 320. Or the user may access the files using the interface of the native application used to view or otherwise access the file (e.g., a video playback application, word processing application, or the like). The system 300 may provide metadata about the files, and a file may be opened using the application(s) 360 associated with the file. The user interface may in some cases also be provided through a file browsing interface provided by the storage manager 310 (e.g., the storage manager 310 console).

In an illustrative example, the user accesses a video file that have been archived (or otherwise copied) to secondary storage devices 380. According to certain embodiments, the file resides in secondary storage and is no longer in the native format of the source application, or is otherwise not directly usable by the source application. However, this fact is transparent to the user in certain embodiments, because the file is logically accessible via the file system executing on the client 320 via a mount point to the secondary copy.

Thus, when the user opens the file (e.g., by opening the file using a file interface of a video playback application running on the client computing device 320, or by clicking on a file icon in Windows Explorer or another file system browser), the client 320, via the mount point, forwards the request to open the file to the storage manager 310.

The user may choose the portion of the file to restore by interacting with the application 360 associated with the file. For instance, the user selects a portion of the file for playback or other access. As one example, the user may open a video file and scroll to a certain point in the video, thereby selecting the starting point for the portion to restore. As another illustrative example, a user may drag a slider icon of a word processing application to scroll to a position towards the end of a very large text document that is being accessed from secondary storage. The word processing application may buffer the document such that the entire document is not initially accessed. In such a case, instead of requesting a restore of the entire contents of the file from the initial position in the document to the scrolled-to position, the client 320 may request that only a portion of the file is restored. For instance, the portion may correspond to one or more application offsets in proximity to the scrolled-to position in the document (e.g., corresponding to a certain buffered portion of the document which includes the scrolled-to position). In some embodiments, when the file is initially opened, the application may request to restore only the beginning portion of the file, and only the range of data corresponding to that portion may be restored from secondary storage.

When the user indicates the portion to be restored, the application 360 can calculate and/or determine one or more corresponding application offsets for the portion. For example, if the user scrolls to a point in a video file or in a text document, the application 360 may designate the corresponding application offset as the start of the portion to restore. The system 300 may designate the number of bytes to restore from the starting application offset (e.g., to the end of the file, a fixed number of bytes for buffering, etc.). In some embodiments, the application 360 can provide both the starting application offset and the end application offset.

At data flow step 2, the client 320 requests a restore of a selected portion of the file. After the application 360 determines the starting application offset (or both the starting and end application offsets), the client 320 may, via the mount point, send a request to the storage manager 310 to restore the portion of the file. For instance, based on the user's input, the application 360 may determine the application offset(s) and forward a request including the offset(s) and any other appropriate information (e.g., file ID, starting application offset, etc.) to the file system executing on the client 320. In turn, the file system, via the mount point, forwards a request, again including the offset(s) and any other appropriate information (e.g., file ID, starting application offset, etc.) to the storage manager 310 to restore the selected portion of the file. In some embodiments, a data agent executing on the client 320 may also be involved in generating the request to the storage manager.

Upon receipt of the request, the storage manager 310 may instruct the appropriate media agent(s) 370 to restore the selected portion, e.g., by referring to the storage manager index 315. For example, the request to restore may be for file F1, which is stored in backup B1 and in Storage Device 1 380. The storage manager 310 can determine, e.g., by referring to the index 315, that the data for file F1 is part of backup B1 and that backup B1 is associated with Media Agent 1 370. The storage manager 310 then can instruct Media Agent 1 370 to restore the selected portion.

At data flow step 3, the partial file restore module 350 accesses the in-chunk index 355 for the chunk 385 in which the selected portion is stored, and searches for the corresponding portion start position in the secondary copy using the in-chunk index 355. The partial file restore module 350 may be a part of or associated with a media agent 370. The media agent 370 that is instructed to restore the selected portion may instruct its associated partial file restore module 350 to access and search through the in-chunk index 355.

In FIG. 3, the secondary copy is referred to as an "archive file," but the secondary copy can be created through various types of storage operations, such as, for example, backup, replication, snapshots, and the like. Similarly, the in-chunk index 355 may also be created while performing various types of storage operations, such as, backup, replication, snapshots, archiving, and the like. The in-chunk index 355 may be created in a similar manner and may have a similar format as described in connection with FIG. 2.

In a specific, illustrative example relating to FIG. 3, the user selects file F1, which has been copied to Storage Device 1 380. The user opens file F1 using the application 360 associated with file F1. The user interacts with the application to select a portion of the file to restore which corresponds to a starting application offset $x_o$. File F1 starts in Chunk $C_1$ 385$a$ and ends in Chunk $C_2$ 385$b$. As explained with respect to FIG. 2, if a file is stored across multiple chunks 385, the media agent index 375 may include information about which part of the file is stored in which chunk 385. For instance, the media agent index 375 may include information about the starting application offset for the file portion in each chunk 385. In this example, Media Agent 1 370 may indicate that the starting application offset for file F1 in chunk $C_2$ 385$b$ is $x_p$. Since the user selected application offset is $x_o$, which is prior to $x_p$, Media Agent 1 370 can determine that it should access the in-chunk index 355 for chunk $C_1$ 385$a$. For the chunk 385 in which the file begins, the media agent index 375 may not need to include information about the starting application offset for the file portion in the chunk 385.

Because the interval between the application offsets may not be fixed, as explained with respect to FIG. 2, the partial file restore module 350 may need to search through the application offsets in the in-chunk index 355. But the number of application offsets in the in-chunk index 355 can be quite large (e.g., for video or other media files), and therefore, there is a need to locate the corresponding secondary copy offset in a quick and efficient manner. Various search techniques may be used to search through the mapping information to locate the corresponding secondary copy offset.

One example of such technique is the binary search. For instance, the partial file restore module 350 may start the search in the middle of the application offsets. If the middle application offset is the same as the user application offset, the partial file restore module 350 can use the corresponding secondary storage offset. If the requested application offset is less than the middle application offset, the partial file restore module 350 compares the user application offset with the middle application offset of the lower half of the application offsets. If the user selected application offset is greater than the middle application offset, the partial file restore module 350 compares the user application offset with the middle application offset in the upper half of the application offsets. The partial file restore module 350 can repeat the binary search process until an application offset equal to the user application offset is found or until it is determined that such offset does not exist.

Depending on the level of granularity and other factors (e.g., whether the interval is fixed or not), the in-chunk index may not include a mapping entry having an application offset that exactly corresponds to the requested application offset. In such cases, the partial file restore module 350 can use the binary search or other search process to locate an application offset in proximity to the requested application offset (e.g., the nearest application offset prior to the requested application offset) and restore starting from that application offset. In such a case, in order to inform the application 360 that the restored file portion does not begin exactly at the requested location, the partial file restore module 350 or other component can send information back to the application 360 indicating the actual starting application offset for the restored portion.

In the specific example, the partial file restore module 350 accesses the in-chunk index 355 for chunk $C_1$ 385$a$ and performs a binary search to locate the entry in the in-chunk index including an application offset that is the same as or closest to the desired application offset $x_o$. The in-chunk index 355 for file F1 does not include an entry having the application offset $x_o$, and the closest application offset that is included in an entry in the in-chunk index is $x_n$, which is less than $x_o$. Accordingly, the partial file restore module 350 determines that the nearest secondary copy offset that comes before the requested offset is $x_n$.

At data flow 4, the media agent 370 restores the selected portion. Once the partial file restore module 350 locates the corresponding or nearest application offset, the media agent 370 can begin restoring the data for the user selected portion. In some embodiments, the in-chunk index 355 may include information about the physical chunk byte position for the secondary copy offsets, and the media agent 370 can seek to the physical byte position and start restoring from that position. The media agent 370 can restore the portion to primary storage (e.g., the information store 330). The media agent 370 may send any related information to the application 360, such as the restore application offset, corresponding secondary copy offset, etc. For example, if the application offset does not map exactly to the user selected application offset, the media agent 370 can send the actual application offset information to the application 360. The application 360 can adjust the application offset accordingly when the user accesses the restored portion.

In this manner, the system 300 may restore the user selected portion of a file from secondary storage in a fast and efficient manner. By providing mapping information between application offsets and secondary copy offsets, the system 300 can quickly locate the corresponding or nearest secondary copy offset for the user selected application offset. Using the in-chunk index 355, the system 300 can provide a fast response time for the restore and a positive user experience. In addition, the in-chunk index 355 may be stored in secondary storage, reducing the amount of data included in the storage manager index 315 and/or the media manager index(es) 375. Partial file restore can reduce the amount of time and resources for restoring files from secondary storage.

Figure 4:
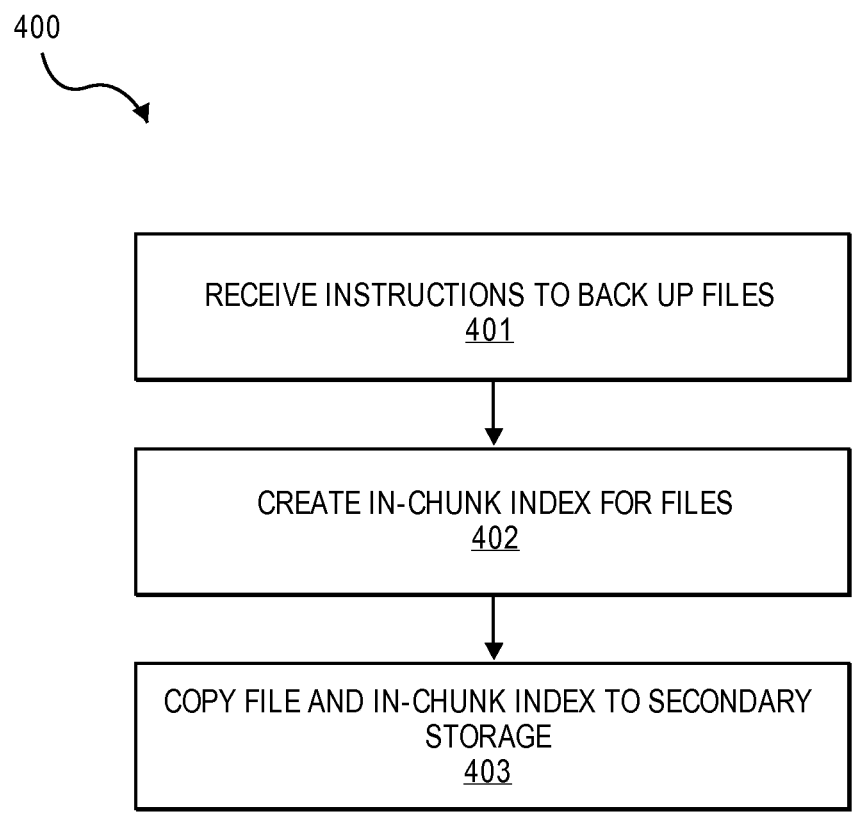
FIG. 4 is a flow diagram illustrative of one embodiment of a routine for creating in-chunk index for partial file restore.

FIG. 4 is a flow diagram illustrative of one embodiment of a routine for creating in-chunk index for partial file restore according to certain embodiments. The routine 400 is described with respect to the system 200 of FIG. 2. However, one or more of the steps of routine 400 may be implemented by other information management systems, such as those described in greater detail above with reference to FIG. 1D. The routine 400 can be implemented by any one, or a combination of, a client, a storage manager, a data agent, a partial file restore module, a media agent, and the like. Moreover, further details regarding certain aspects of at least some of steps of the routine 400 are described in greater detail above with reference to FIG. 2. Although described in relation to backup operations for the purposes of illustration, the process of FIG. 4 can be compatible with other types of storage operations, such as, for example, migration, snapshots, replication operations, archiving, and the like.

At block 401, the storage manager 210 receives instructions to back up files. The storage manager 210 may instruct one or more media agents 270 to initiate backup.

At block 402, the partial file restore module 250 creates one or more in-chunk indexes 255 for the files. The partial file restore module 250 may be a part of a media agent 270. When the media agents 270 are instructed to perform a backup, the media agents 270 may instruct the respective partial file restore modules 250 to create the in-chunk index 255.

At block 403, the media agents 270 copy the files and the in-chunk indexes 255 to the secondary storage devices 280. The in-chunk index 255 for a chunk 285 can be stored with the chunk 285 in the storage devices 280. The in-chunk index 255 may be stored as a part of the chunk metadata and/or as one or more chunk index files.

As explained in connection with FIG. 2, an in-chunk index 255 entry may be created for each buffer write. For example, the partial file restore module 250 creates the in-chunk index 255 entry for the portion of the file being processed in the current buffer write operation, and the media agent 270 writes the portion of the file and the in-chunk index 255 entry to the storage device 280.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 5:
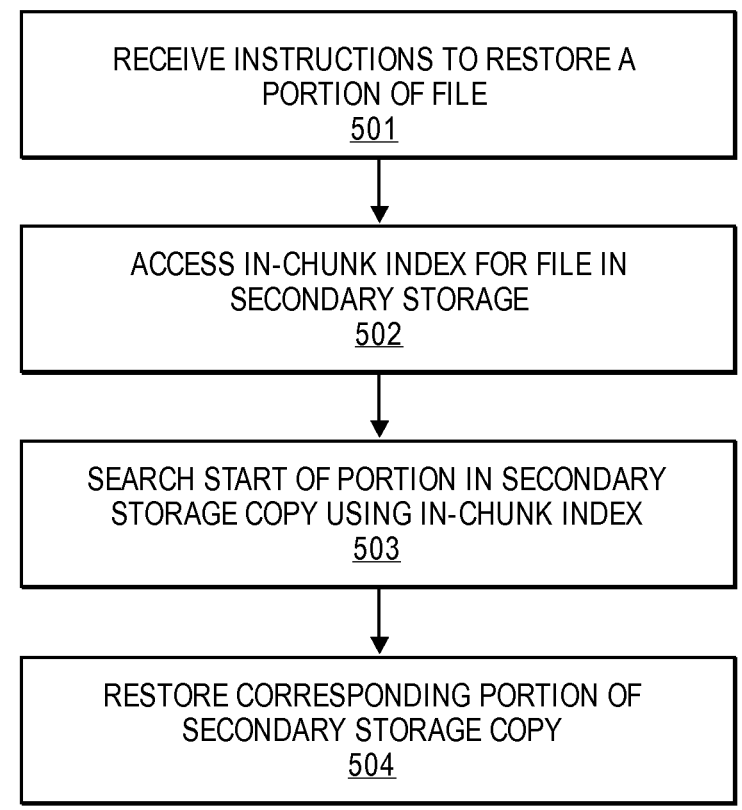
FIG. 5 is a flow diagram illustrative of one embodiment of a routine for restoring a file using partial file restore.

FIG. 5 is a flow diagram illustrative of one embodiment of a routine for restoring a file using partial file restore according to certain embodiments. The routine 500 is described with respect to the system 300 of FIG. 3. However, one or more of the steps of routine 500 may be implemented by other information management systems, such as those described in greater detail above with reference to FIGS. 1D and 2. The routine 500 can be implemented by any one, or a combination of, a client, a storage manager, a data agent, a partial level restore module, a media agent, and the like. Moreover, further details regarding certain aspects of at least some of steps of the routine 500 are described in greater detail above with reference to FIG. 3. Although described in relation to backup operations for the purposes of illustration, the process of FIG. 5 can be compatible with other types of storage operations, such as, for example, migration, snapshots, replication operations, archiving, and the like.

At block 501, the storage manager 310 receives instructions to restore a portion of a file, e.g., from a client 320. The storage manager 310 may receive one or more application offsets for the portion to be restored. The storage manager 310 may determine which media agent(s) 370 should be instructed to restored the requested data (e.g., by referring to the storage manager index 315).

At block 502, the appropriate media agent(s) 370 accesses the in-chunk index 355 for the file in the secondary storage devices 370. For example, the media agent 370 may determine which chunk 385 stores the portion of the file to be restored (e.g., by referring to the media agent index 375). Once the media agent 370 determines the chunk 385 to be restored, the media agent 370 accesses the in-chunk index 355 for that chunk 385.

At block 503, the partial file restore module 350 searches for the start of the portion in the secondary copy using the in-chunk index 355. The partial file restore module 350 may be a part of the media agent 370, and the media agent 370 may instruct the partial file restore module 350 to search through the in-chunk index 355. The partial file restore module 350 can perform a search through the application offsets in the in-chunk index 355 to find the corresponding or nearest secondary copy offset.

At block 504, the media agent 370 restores the corresponding portion of the secondary copy from the storage devices 380. Once the partial file restore module 350 determines the corresponding or nearest secondary copy offset, the media agent 370 can restore the data starting from the secondary copy offset. The media agent 370 may restore a certain number of bytes from the secondary copy offset, or may restore to the end of the chunk or file. After the media agent 370 begins restoring the data, the application 360 can start accessing the restored data in the information store 330.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

An Exemplary Information Management System for Implementing Partial Sharing of Files The systems and methods described with respect to FIGS. 1A-1H and 2-6 can be used for file sharing, including for restoring and/or sharing portions of files. For instance, according to certain embodiments, the user may share a portion of a file in secondary storage with other users. Such a portion may be the portion of the file the user wants to view or restore, as discussed in connection with FIGS. 2-5. The portion of the secondary storage file to be shared can be sent to the recipient user as a link to the portion of the file. In some embodiments, the user may decide to share an entire file instead of a portion of a file, and the link sent to the recipient user can be a link to the entire file.

The systems and methods described with respect to FIGS. 1A-1H, 2, and 3 can be used for sharing a portion of files in secondary storage. For instance, the system of FIGS. 1D, 2, and 3 can include a partial sharing module (not shown) that generally manages partial sharing of secondary storage files in a information management system 100, 200, 300. In some embodiments, the partial sharing module is a software module that forms a part of or resides on the storage manager 140, 210, 310 or, alternatively, the media agents 144, 270, 370. The partial sharing module can additionally be a software module executing on one or more of the client computing devices 102, 220, 320. In some embodiments, the partial sharing module may be implemented as a part of the data agent 142. The system of FIGS. 1D, 2, and 3 can also include one or more indexing agents (not shown) that generally perform content indexing of secondary storage data in a information management system 100, 200, 300. The indexing agents may also obtain metadata related to secondary storage data. In some embodiments, an indexing agent is a software module that forms a part of or resides on the media agent 144, 270, 370. In other embodiments, the indexing agent may be implemented as a part of other components in the system 100, 200, 300. The partial sharing of secondary storage files will be discussed in more detail with respect to FIGS. 6-9.

Figure 6:
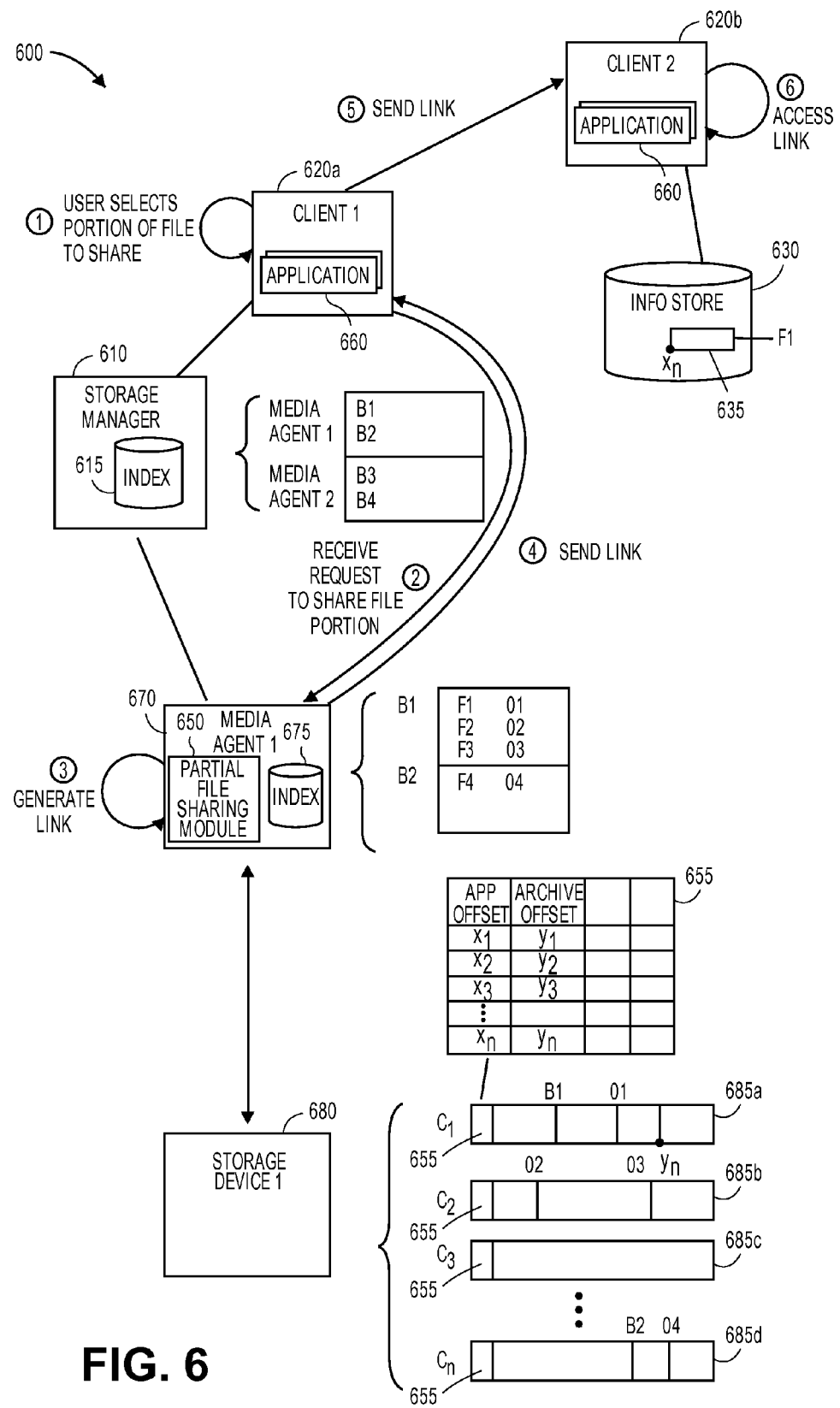
FIG. 6 is a data flow diagram illustrative of the interaction between the various components of an exemplary information management system configured to implement partial file sharing, according to certain embodiments.

FIG. 6 is a data flow diagram illustrative of the interaction between the various components of an exemplary information management system 600 configured to implement partial sharing of files, according to certain embodiments. As illustrated, the exemplary information management system 600 includes a storage manager 610, one or more client computing devices (a first client computing device 620a and a second client computing device 620b are depicted in FIG. 6), an information store 630 (e.g., a disk drive or other storage device associated with the second client computing device 620b), a partial sharing module 650, one or more applications 660, one or more media agents 670, and one or more secondary storage devices 680. The information store 630 may reside in a primary storage subsystem, while the secondary storage devices 680 may reside in a secondary storage subsystem, for example. The partial sharing module 650 may be similar to the partial file restore module 250, 350 in FIGS. 2 and 3. The system 600 and corresponding components of FIG. 6 may be similar to or the same as the system 100, 200, 300 and similarly named components of FIGS. 1D, 2, and 3. Moreover, depending on the embodiment, the system 600 of FIG. 6 may additionally include any of the other components shown in FIGS. 1D, 2, and 3 that are not specifically shown in FIG. 6 (e.g., one or more data agents, etc.). The system 600 may include one or more of each component. All components of the system 600 can be in direct communication with each other or communicate indirectly via the client computing devices 620a, 620b, the storage manager 610, the media agent 670, or the like. In certain embodiments, some of the components in FIG. 6 shown as separate components can reside on a single computing device, or vice versa. For example, the partial sharing module 650 can be on the media agent 670 or on a separate computing device.

With further reference to FIG. 6, the interaction between the various components of the exemplary information management system will now be described in greater detail with respect to data flow steps indicated by the numbered arrows.

At data flow step 1, the user selects a portion of a file in secondary storage to share with another user, e.g., at a first client computing device 620a. As explained in connection with FIGS. 2-5, the user can indicate the start offset and/or the end offset for the portion of the secondary storage file to share using the application 660 associated with the file. The offsets selected by the user using the application 660 may be based on the native format of the file (e.g., the format of the primary copy of the file prior to being copied and/or moved to secondary storage) and may correspond to one or more application offsets (e.g., a starting offset $x_n$) that then need to be converted to corresponding secondary storage offsets of the file, as explained above, e.g., with respect to FIGS. 2 and 3.

The user may select a portion of the file to share and access a menu to share the portion with another user. For example, the user can invoke a context menu by right-click mouse operation, and the context menu may include a menu item to share the selected portion of the file. Certain details relating to selecting a portion of a secondary storage file to share are described with respect to FIGS. 7-8. In some embodiments, the user may want to share an entire secondary storage file, instead of sharing only a portion. In such case, the user can share the secondary storage file without indicating a start and/or end offset for the portion to be shared.

At data flow step 2, the client computing device 620a sends a request to share the portion of the file. The request can include one or more application offsets for the portion to be shared. For example, the request can include the start application offset or both the start and end application offsets. The storage manager 610 can receive such request and forward it to a partial sharing module 650. The partial sharing module 650 may be a part of the storage manager 610 or a media agent 670, depending on the embodiment. The link to the portion of the file may include the secondary storage offsets of the file that correspond to the portion to be shared. In order to determine the secondary storage offsets, the partial sharing module 650 may access the in-chunk index 655 in the secondary storage devices 680 or in the media agent index 675. For example, the partial sharing module 650 can refer to the in-chunk index 655 of the chunk 685 that includes the portion of the file to be shared. Accordingly, in some embodiments, the partial sharing module 650 may reside on a media agent 670. For example, each media agent 670 can include a partial sharing module 650, and the request to share the portion of the file can be forwarded to the media agent 670 and/or the partial sharing module 650 that has access to the in-chunk index 655. In some embodiments, the partial sharing module 650 resides on the storage manager 610 and generates the link based on information from the media agents 670.

At data flow step 3, the partial sharing module 650 generates a link to the portion of the file. If there is more than one partial sharing module 650 in the system 600, the partial sharing module 650 that has access to the in-chunk index 655 for the portion of the file can generate the link based on the in-chunk index 655. For example, if the portion of the file to be shared is stored in Storage Device 1 680 and Media Agent 1 670 is associated with Storage Device 1 680, the partial sharing module 650 associated with Media Agent 1 670 accesses the in-chunk index 655 to generate the link to the portion of the file. As explained above, the link can include the secondary storage offsets corresponding to the portion of the file to be shared such that accessing the link can automatically trigger a restore of the shared portion. The restore of the portion can be fast and efficient since the appropriate secondary storage offsets are already identified by the link. In some embodiments, the application offsets selected by the user in the application 660 may not correspond exactly to secondary storage offsets in the in-chunk index 655. In these embodiments, the secondary storage offsets that are closest to the application offsets may be included in the link. In one embodiment, the link is a UNC (Universal Naming Convention) path. UNC paths can be used to access network resources. In some embodiments, the user does not select a portion of the file, but shares the whole file. In these embodiments, the link does not include secondary storage offsets.

In certain embodiments, the portion of the file to share may be generated using content index data for secondary storage files. For instance, files in secondary storage may be content indexed, and the user may search the content index data to identify files that contain a specific keyword or phrase. The search results can display portions of files in the content index data that contain the keyword or phrase, and the user can select a portion of a file to share from the displayed portions of files that meet the search criteria. In such case, the link may be to the content index data. For instance, a paragraph of a file in the content index data that includes the keyword may be displayed to the user, and the user can share the paragraph with another user. Some details relating to content indexing are further explained in connection with FIGS. 9-10.

The link can include a preview of the portion of the file. For example, the file can be a video file, and the preview can include an image from the portion of the file. Or the file can be a document, and the preview can include some text from the portion of the file to be shared. In one embodiment, the link is in the form of a preview (e.g., an image of a video file is displayed as a preview and can be clicked on to access the portion). In certain embodiments, the preview can be from content index data.

At data flow step 4, the partial sharing module 650 sends the link to the first client computing device 620*a* that requested the link. The generated link can be forwarded to the requesting first client computing device 620*a*, for example, to be included in an email.

At data flow step 5, the link is sent to another user. For example, the link may be sent in an email by a user associated with the first client computing device 620*a* to another user associated with the second client computing device 620*b*. The link may be authenticated such that only authorized users can access the link and the portion of the file. If it is determined that the recipient user is not authorized to view or access the portion of the file, a preview for the link may not be displayed.

At data flow step 6, the user who receives the link accesses the portion of the file through the link. Accessing the link may trigger a request to restore the portion of the file represented by the link. The request to restore may be received by the storage manager 610, and the storage manager 610 can instruct the appropriate media agent 670 to restore the requested portion. Since the link can include the secondary storage offsets corresponding to the portion of the file to be shared, the requested portion can be restored quickly, e.g., without further processing to identify which portion of the file corresponds to the portion to be restored. The restored portion of the file may be stored in information store 630, for example, and the application 660 can start accessing the restored data from the information store 630. In some embodiments, the restored portion of the file is only loaded into main memory of the second client computing device 620*b* (or other appropriate computing device) during access (e.g., playback) instead of being separately stored in the information store 630. Certain details relating to restoring the portion of the file are explained above in connection with FIGS. 3 and 5.

In other embodiments, the link may not include the secondary storage offsets, but may instead include the application offsets, and the application offsets may be converted to corresponding secondary storage offsets at the time of restore. The process of determining the secondary storage offsets of the shared portion and restoring the portion can be similar to the data flow steps described with respect to FIG. 3.

Figure 7:
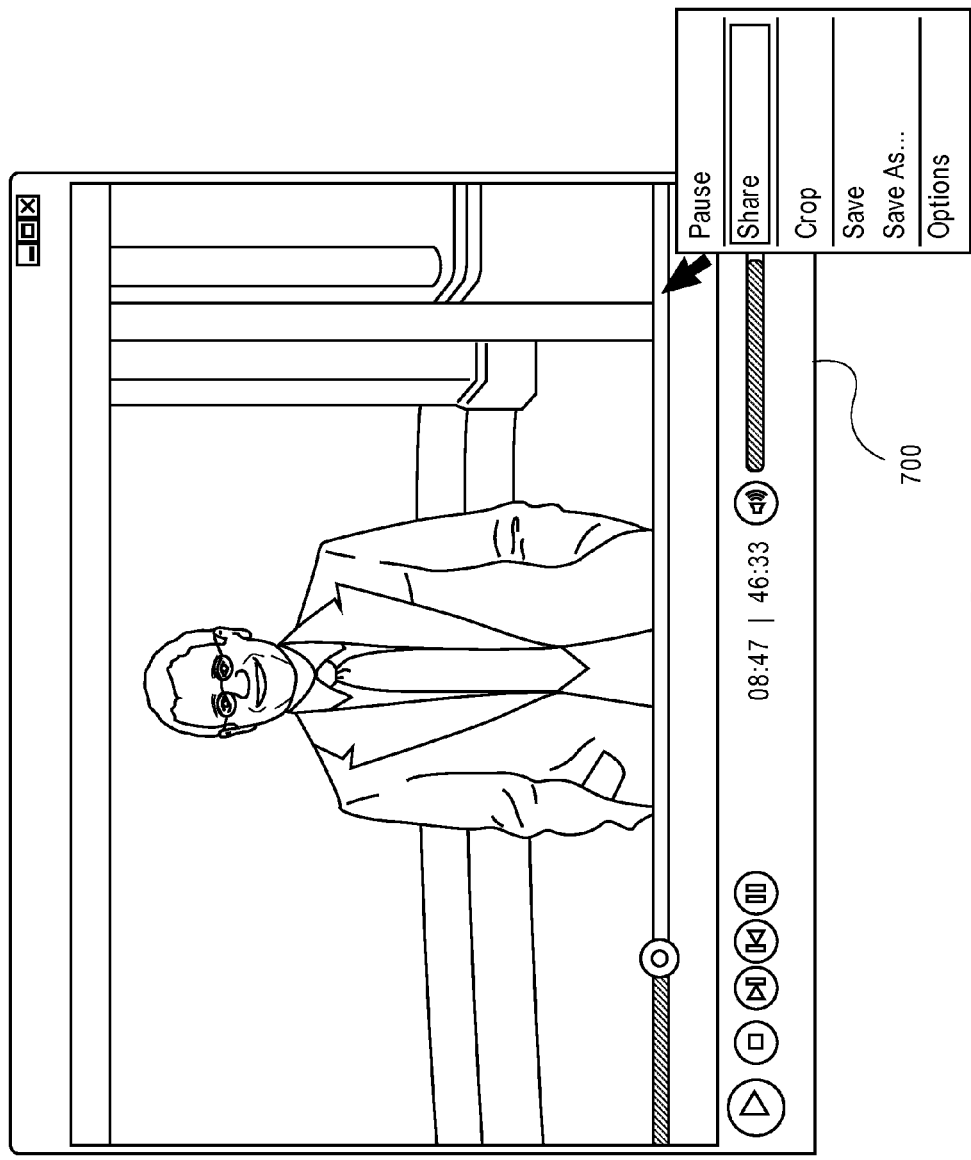
FIG. 7 illustrates an exemplary user interface for sharing a portion of a video file in secondary storage.

FIG. 7 illustrates an exemplary user interface 700 for sharing a portion of a video file in secondary storage. In FIG. 7, the user interface 700 displays a user interface of an application that is used to access a video file in secondary storage. The application can be a native application associated with a file that has been moved or copied to secondary storage, as described in FIGS. 2, 3, and 6. For instance, the application can be Microsoft Windows Media Player, and the video file can be in a format recognized by Media Player.

The user may select a portion of the video file to share through a menu. For instance, the user may access a context menu by a right-click mouse operation, and the context menu can include a menu item to share a portion of the video file. A variety of mechanisms are possible for allowing the user to select the portion of the file. For example, the context menu can include a menu item to share a portion of file starting from current position. The menu can provide an option to share a designated length of the video file from the current position (e.g., share 10 minutes, 15 minutes, 20 minutes, etc.). In another example, the user may be able to indicate the start offset and/or the end offset of the portion to share (e.g., by choosing the start offset and/or the end offset on the playback slider). In other embodiments, the user may be able to select a portion of the video file on the playback slider, and share the currently selected portion of the video file by selecting the menu option in the context menu.

Figure 8:
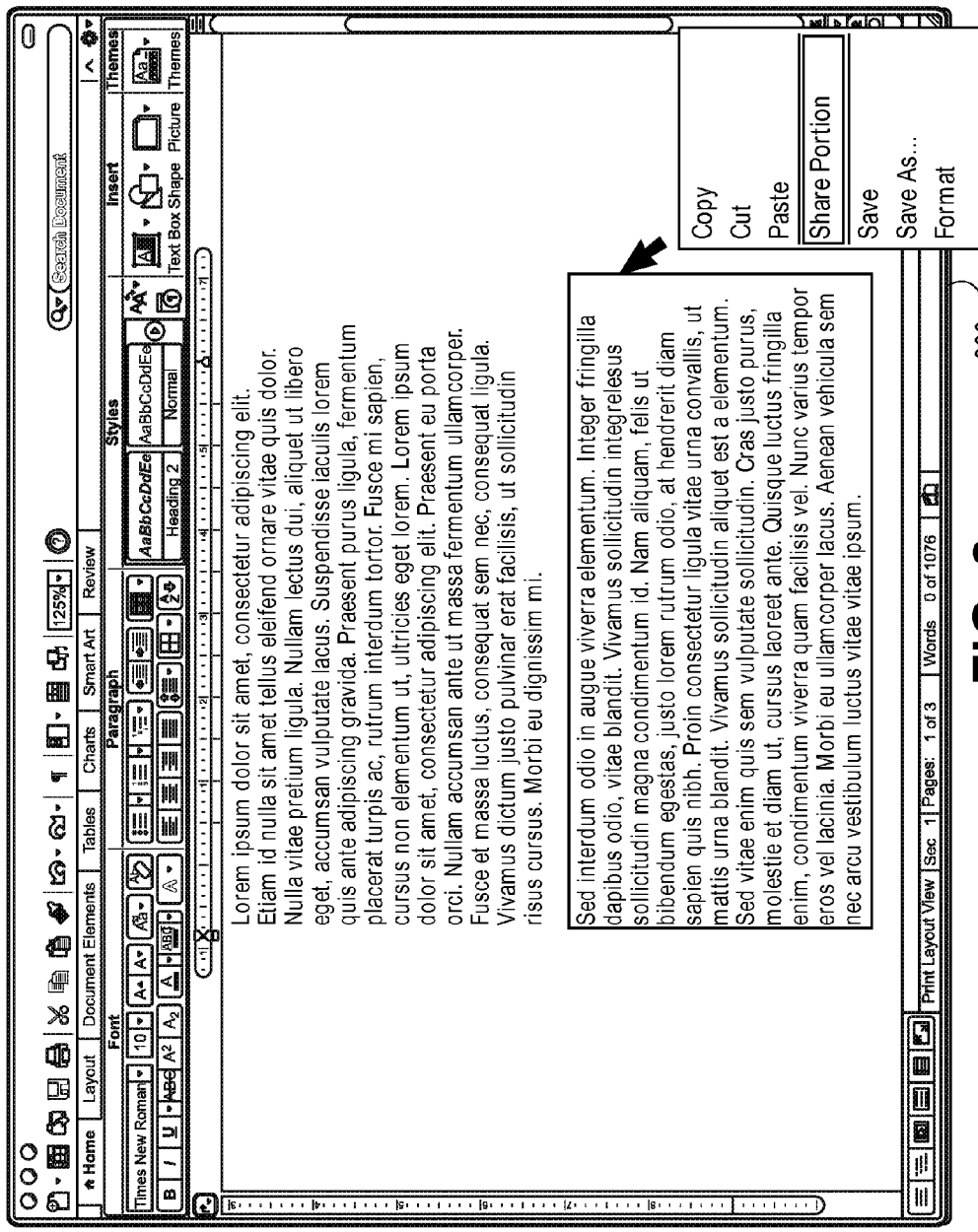
FIG. 8 illustrates an exemplary user interface for sharing a portion of a document in secondary storage.

Users can share a variety of different types of documents. For instance, FIG. 8 illustrates an exemplary user interface 800 for sharing a portion of a document in secondary storage. In FIG. 8, the user interface 800 displays a user interface of an application that is used to access a document file in secondary storage. The application can be a native application 260, 360, 660 associated with a file that has been moved or copied to secondary storage, as described in FIGS. 2, 3, and 6. For example, the application may be Microsoft Word, and the document file can be a secondary copy of a Word file.

The user may select a portion of the document file to share using a menu in the user interface 800 of the application. For example, the user may access a context menu by a right-click mouse operation, and the context menu can include a menu item to share a portion of the document file. The user can select a portion of the document to share in the user interface 800, and right-click to show the context menu and choose the menu option to share the selected portion of the document. In some embodiments, the user may indicate the portion to share by selecting the start and the end of the portion.

Figure 9:
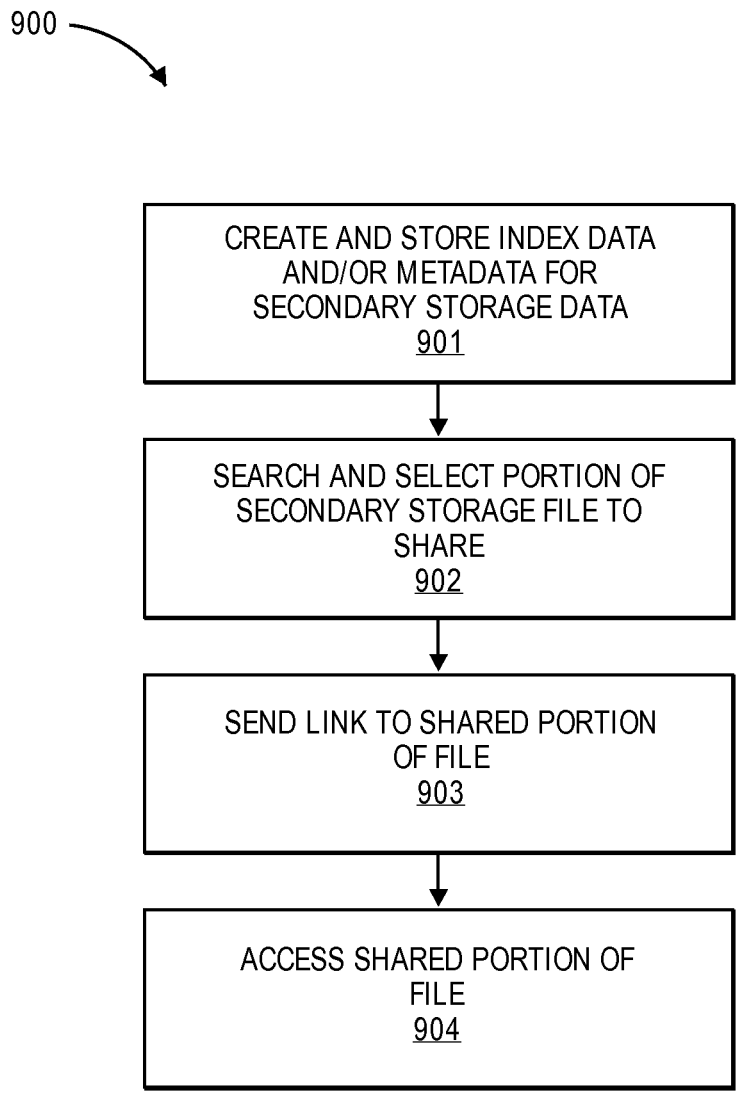
FIG. 9 is a flow diagram illustrative of one embodiment of a routine for partial sharing of secondary storage files.

FIG. 9 is a flow diagram illustrative of one embodiment of a routine 900 implemented by an information management system for sharing a portion of secondary storage files. The routine 900 is described with respect to the system 100 of FIG. 1D. However, one or more of the steps of routine 900 may be implemented by other information management systems, such as any of the systems 200, 300, 600 in FIGS. 2, 3, and 6. The routine 900 can be implemented by any one, or a combination of, a client computing device, a storage manager, a data agent, a media agent, and the like. Although described in relation to backup operations for the purposes of illustration, the process of FIG. 9 can be compatible with other types of storage operations, such as, for example, migration, snapshots, replication operations, and the like.

At block 901, one or more media agents 144 create and store index data and/or metadata for secondary storage data. Secondary storage data may be created from a backup operation (or other secondary copy operation, such as archiving, snapshot, replication, etc.) of primary storage data. The index data and/or metadata may be stored, for example, in the media agent database 152. The index data can include content index data. For instance, an indexing module on the media agent 144 may generate a content index of secondary copies (e.g., a backup, archive, or snapshot) and store it within the media agent database 152.

The media agent 144 may use the content index and/or metadata to locate secondary storage data objects that match search terms and/or other search criteria. The content index can include attributes and/or metadata in native format (e.g., the format of an application that generated the data).

Content indexes can be created using any known technique, including those described in U.S. Patent Publication No. 2008/0228771, entitled "METHOD AND SYSTEM FOR SEARCHING STORED DATA," which is incorporated herein by reference in its entirety.

The indexing module can create an index of an organization's content by examining files generated from routine secondary copy operations performed by the organization. The indexing module can index content from current secondary copies of the system as well as older copies that contain data that may no longer be available on the organization's network. For example, the organization may have secondary copies dating back several years that contain older data that is no longer available, but may still be relevant to the organization. The indexing module may associate additional properties with data that are not part of traditional indexing of content, such as the time the content was last available or user attributes associated with the content. For example, user attributes such as a project name with which a data file is associated may be stored.

Members of the organization can search the created content index to locate content on a secondary storage device. For example, a user may search for content available during a specified time period, such as email received during a particular month. A user may also search specifically for content that is no longer available, such as searching for files deleted from the user's primary computer system. The user may perform a search based on the attributes described above, such as a search based on the time an item was deleted or based on a project with which the item was associated. A user may also search based on keywords associated with user attributes, such as searching for files that only an executive of the organization would have access to, or searching for files tagged as confidential.

At block 902, a user searches for a file in the secondary storage devices 108 and selects a portion of the file to share with another user. For example, the user can search for files stored in the storage devices 108 that meet certain criteria. The search can be based on search term(s) and/or other criteria. The storage manager 140 may receive the search request and forward the search term(s) and/or other criteria to the appropriate media agent 144. The media agents 144 may refer to the index data and/or metadata in order to identify relevant files. In some embodiments, the user does not search for a file, but selects a file while browsing the secondary storage files, e.g., in a native view that will be explained in detail with respect to FIG. 10 below.

One the user chooses a secondary storage file, the user can select a portion of the file to share with another user. In many cases, the user may not need to share an entire file. For example, a user may want to share only 2 relevant pages out of a 100-page document. The user can indicate the start and the end of the portion to share. In some embodiments, the selection of the portion is based on proximity to search terms found in the file. For instance, the portion may be the paragraphs in which one or more search terms are found.

At block 903, the user sends a link to the shared portion of the file. After the user selects the portion of the file to share, the user can send a link or pointer to the shared portion. For instance, the link may be sent in an email. The link may be authenticated so that only the intended recipient can view the file. The link can be shown as or displayed with a preview. Such preview may be implemented with data in the content index. The link can be to the data in the content index and/or actual file in the storage devices 108. For example, the link may include information about the start offset and the end offset for the portion of the file. In some embodiments, the link can be to a link to a reference copy that provides a filtered view or representation of secondary storage data. A reference copy is explained in detail in U.S. patent application Ser. Nos. 13/791,018 and 13/791,043, entitled "FILTERED REFERENCE COPY OF SECONDARY STORAGE DATA IN A DATA STORAGE SYSTEM," which are incorporated herein by reference in their entireties. The link may include information associated with the search that the sender conducted in order to locate the file. For instance, the link can include the query that was sent to the storage manager 140.

At block 904, a user who receives the link accesses the shared portion of the file. The recipient user can click on the link in order to view the shared portion. As explained above, the shared portion may be from the content index and/or the actual file. The user may not be able to access parts of the file that are not shared by the sender. In some embodiments, the user may be able to view the parts that are not selected for sharing. The link may be displayed with or as a preview of the shared portion. When the recipient user accesses the link, the designated portion of the file can be restored from the content index and/or the storage devices 108, depending on which source is used for sharing.

In this manner, secondary storage files can be shared, making the primary storage files available for other uses. In addition, only a portion designated for sharing can be retrieved from the content index and/or the storage devices 108, instead of retrieving the entire file, thereby reducing the amount of resources used.

The routine 900 can include fewer, more, or different blocks than those illustrated in FIG. 9 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

An Exemplary Information Management System for Implementing Native View of Secondary Storage Data The systems and methods described with respect to FIGS. 1A-1H, 2, 3, and 6 can also be used for implementing a native view of secondary storage data. For instance, the system of FIG. 1D can include a native view module (not shown) that generally manages obtaining index data (e.g., including content index) and/or metadata in native format and providing a native view of secondary storage data in a information management system 100. The secondary storage data (e.g., secondary storage file system) may be mounted so that it can be accessed through the native browser or application on a client computing device 102. In some embodiments, the native view module is a software module executing on one or more of the client computing device 102. The native view module can additionally be a software module that forms a part of or resides on the storage manager 140 or, alternatively, the media agents 144. In some embodiments, the partial sharing module may be implemented as a part of the data agent 142. Providing a native view of secondary storage data will be discussed in more detail with respect to FIG. 10.

Figure 10:
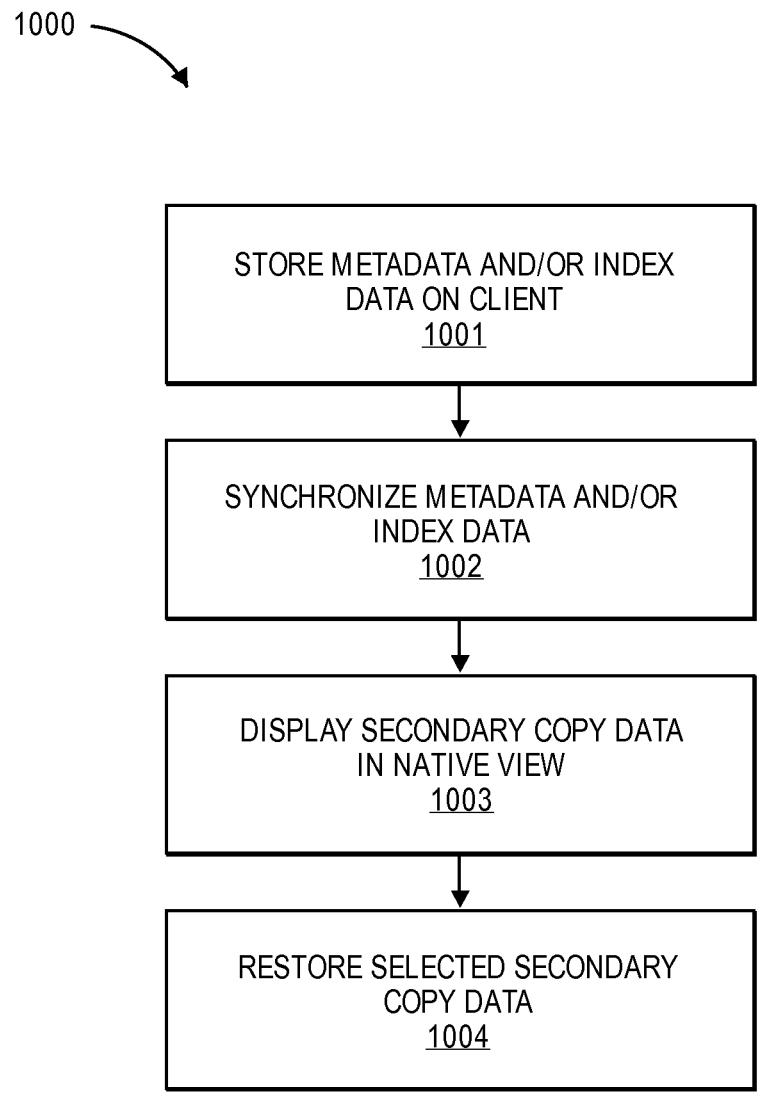
FIG. 10 is a flow diagram illustrative of one embodiment of a routine for implementing a native view of secondary storage data.

FIG. 10 is a flow diagram illustrative of one embodiment of a routine 1000 implemented by an information management system for sharing a portion of secondary storage files. The routine 1000 is described with respect to the system 100 of FIG. 1D. However, one or more of the steps of routine 1000 may be implemented by other information management systems, such as the system 200, 300, 600 in FIGS. 2, 3, and 6. The routine 1000 can be implemented by any one, or a combination of, a client computing device, a storage manager, a data agent, a media agent, and the like. Although described in relation to backup operations for the purposes of illustration, the process of FIG. 10 can be compatible with other types of storage operations, such as, for example, migration, snapshots, replication operations, and the like.

At block 1001, the client computing device 102 locally stores metadata and/or index data relating to secondary storage data in the storage devices 108. The secondary storage data may be generated, e.g., through a backup operation or other secondary copy operations. The client computing device 102 may initially receive the metadata and/or index data or obtain the metadata and/or index data so that it can store them locally. The metadata and/or index data may be stored on the client computing device 102 machine itself, or in an information store 104 associated with the client computing device 102. The stored metadata and/or index data can be available to the client computing device 102 without accessing information in secondary storage (e.g., index data stored by the media agents 144). For instance, the stored metadata and/or index data may be available when the secondary storage is "offline." The index data can include content index data, and a content index may be created and used in ways described with respect to FIG. 9. The metadata, index data, and/or content index data may be stored in native format, e.g., the format of the application(s) that generated the secondary storage data.

At block 1002, the client computing device 102 synchronizes the metadata and/or index data relating to the secondary storage data. The client computing device 102 may periodically update the stored metadata and/or index data to reflect the most recent version of the metadata and/or the index in secondary storage (e.g., as stored in the media agents 144). The client computing device 102 may update the metadata and/or index data, e.g., according to a schedule, based on events, at user request, etc. The client computing device 102 may synchronize only the metadata and/or the index without retrieving and/or synchronizing the secondary storage data. In this manner, the amount of data that is downloaded from secondary storage to the client computing device 102 and/or the information store 104 can be reduced.

At block 1003, the client computing device 102 displays the secondary copy data in a native view. Because the metadata and/or the index can be stored in native format, viewing and browsing of the secondary storage data can be integrated into the native view. For example, the backed up data can be browsed using Windows Explorer, instead of going to a separate application for browsing/viewing secondary storage data. In one embodiment, the secondary storage data can be displayed under a "backup" or "archive" node in Windows Explorer. By incorporating the secondary storage data into the native view, the system 100 can make it easier to navigate various files using a single interface. Moreover, an application can display various files in a native view without regard to the source of the data (e.g., primary or secondary storage).

In some embodiments, the native view may be for the file system (e.g., Windows Explorer), and the native view may display the file system structure for the secondary storage data. The secondary storage file system may be structured as a file system tree, listing folders and data objects as they are structured in the file system that has been copied to secondary storage (e.g., backed up, archived, or had a snapshot taken). The structure of the actual file system may be included in the content index and may be used to generate the secondary storage file system. The client computing device 102 may mount the secondary storage file system. For example, the operating system of the client computing device 102 may mount the secondary storage file system to make it accessible via the file system of the client computing device 102. The secondary storage file system may appear as a new drive or partition within the file system of the client computing device 102 (e.g., as the "E:\" drive).

At block 1004, the client computing device 102 restores secondary copy data that is selected by the user. If a user selects a file in the native view, the client computing device 102 can send a request to restore the file to the storage manager 140. The storage manager 140 can instruct the media agents 144 to restore the file. In this manner, only the data requested by the user can be restored to primary storage, but the user can still browse all of the files in secondary storage based on attributes, metadata, content index, etc.

The routine 1000 can include fewer, more, or different blocks than those illustrated in FIG. 10 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

TERMINOLOGY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application, in either this application or in a continuing application.

What is claimed is:

1. A method of sharing a portion of a file in secondary storage, the method comprising:

using one or more computing devices comprising computer hardware:

receiving a request to share a portion of a file in a secondary storage subsystem from a client computing device residing in a primary storage subsystem, the request including at least one application offset generated in response to user selection of the portion of the file via a first graphical user interface of a software application, the at least one application offset corresponding to the portion of the file and associated with indexing of the file by the software application that is used to access the portion of the file for presentation to a user;

using the at least one application offset, identifying, with a computing device that is separate from the client computing device, a start secondary storage offset associated with storage of the file, the start secondary storage offset separate from the at least one application offset and corresponding to a location of the portion of the file on a first storage device residing in the secondary storage subsystem, said identifying a start secondary storage offset comprising:

accessing a media agent index;

identifying, using the media agent index and based at least in part on the at least one application offset, a logical data chunk of a plurality of logical data chunks stored on the first storage device, wherein the logical data chunk: (i) includes secondary copies of one or more files stored in the secondary storage subsystem including the portion of the file and (ii) has a chunk index stored with the logical data chunk on the first storage device, the chunk index providing a mapping of one or more application offsets corresponding to data stored on a corresponding logical data chunk to one or more corresponding secondary storage offsets indicating locations on the first storage device;

accessing the chunk index that is stored with the logical data chunk on the first storage device; and using the at least one application offset to identify the start secondary storage offset in the index;

generating a link to the portion of the file, the link including a reference to the start secondary storage offset;

causing the link to be provided for display to a user via a second graphical user interface; and in response to receipt of an indication of a user selection of the link, causing a restore of the portion of the file from the first storage device for presentation by the software application to a user, without restoring the entire file from the first storage device, wherein the restore comprises restoring the portion of the file beginning from a point referenced by the start secondary storage offset included in the link to access the portion of the file from the first storage device.

2. The method of claim 1, wherein the link comprises the start secondary storage offset and an end secondary storage offset corresponding to the portion of the file.

3. The method of claim 1, wherein the link is authenticated to provide access to only an authorized entity.

4. The method of claim 1, wherein the link is usable to view a preview of the portion of the file.

5. The method of claim 1, wherein the user selection of the link is by a user of a second client computing device, the method further comprising restoring the portion of the file from the first storage device to a second storage device residing in the primary storage subsystem and associated with the second client computing device.

6. The method of claim 1, wherein the index comprises a list of entries including mapping information, each entry providing a mapping between a secondary storage offset and a corresponding application offset associated with the software application.

7. The method of claim 1, wherein:

the at least one application offset comprises a start application offset to indicate a beginning of the portion of the file; and said identifying a start secondary storage offset associated with the file comprises using the start application offset to identify the start secondary storage offset.

8. The method of claim 1, further comprising:

receiving user-entered search criteria from the client computing device;

determining that the file meets the search criteria; and providing search results for display to a user, wherein the user can interact with the search results to select the portion of the file for sharing.

9. The method of claim 8, wherein said determining comprises performing a search based on the search criteria using content index data associated with a plurality of files in the secondary storage subsystem that includes the file.

10. The method of claim 1 wherein the index includes a plurality of pairs of offsets, each of the pairs including an application offset and a corresponding secondary storage offset, and wherein said using the at least one application offset to identify the start secondary storage offset in the index comprises iteratively searching through the index to find a first pair of offsets in the plurality of pairs of offsets which includes the start secondary storage offset.

11. The method of claim 10, wherein the first pair of offsets has an application offset with a first value nearer to a second value of the at least one application offset than any of the other pairs of offsets, the first value different than the second value.

12. A data storage system configured to share a portion of a file in secondary storage, the system comprising:

a first storage device residing in a secondary storage subsystem and storing a plurality of files including a first file; and computer hardware configured to execute instructions that cause the computer hardware to:

receive a request to share a portion of the first file from a client computing device residing in a primary storage subsystem, the request including at least one application offset generated in response to user selection of the portion of the first file via a first graphical user interface of a software application, the at least one application offset corresponding to the portion of the first file and associated with indexing of the file by the software application that is used to access the portion of the first file for presentation to a user;

access a media agent index;

identify, using the media agent index and based at least in part on the at least one application offset, a logical data chunk of a plurality of logical data chunks stored on the first storage device, wherein the logical data chunk: (i) includes secondary copies of one or more files stored in the secondary storage subsystem including the portion of the file and (ii) has a chunk index stored with the logical data chunk on the first storage device, the chunk index providing a mapping of one or more application offsets corresponding to data stored on a corresponding logical data chunk to one or more corresponding secondary storage offsets indicating locations on the first storage device;

access the chunk index that is stored with the logical data chunk on the first storage device; and identify in the index, using the at least one application offset, a start secondary storage offset associated with storage of the first file, the start secondary storage offset separate from the application offset and corresponding to a location of the portion of the first file on the first storage device;

generate a link to the portion of the first file, the link including a reference to the start secondary storage offset; and cause the link to be provided for display to a user via a second graphical user interface; and in response to receipt of an indication of a user selection of the link, cause a restore of the portion of the first file from the first storage device for presentation by the software application to a user, without restoring the entire first file from the first storage device wherein the restore comprises restoring the portion of the file beginning from a point referenced by the start secondary storage offset included in the link to access the portion of the file from the first storage device.

13. The system of claim 12, wherein the link comprises the start secondary storage offset and an end secondary storage offset corresponding to the portion of the first file.

14. The system of claim 12, wherein the link is authenticated to provide access to only an authorized entity.

15. The system of claim 12, wherein the user selection of the link is by a user of a second client computing device, the instructions further configured to cause the computer hardware to restore the portion of the first file from the first storage device to a second storage device residing in the primary storage subsystem and associated with the second client computing device.

16. The system of claim 12, wherein the index comprises a list of entries including mapping information, each entry providing a mapping between a secondary storage offset associated with the first file and a corresponding application offset of the first file associated with the software application.

17. The system of claim 12, wherein:

the at least one application offset comprises a start application offset to indicate a beginning of the portion of the first file; and the identification of the start secondary storage offset associated with the first file is performed at least in part by using the start application offset to identify the start secondary storage offset.

18. The system of claim 12, wherein the instructions further cause the computer hardware to:

receive user-entered search criteria from the client computing device;

determine that the first file meets the search criteria; and provide search results for display to a user, wherein the user can interact with the search results to select the portion of the first file for sharing.

19. The system of claim 18, wherein the determination that the first file meets the search criteria is performed at least in part by executing a search using content index data associated with a plurality of files in the secondary storage subsystem that includes the first file.

20. The system of claim 12 wherein the index includes a plurality of pairs of offsets, each of the pairs including an application offset and a corresponding secondary storage offset, and wherein the computer hardware is configured to execute instructions that cause the computer hardware to iteratively search through the index to find a first pair of offsets in the plurality of pairs of offsets which includes the start secondary storage offset.

21. The method of claim 20, wherein the first pair of offsets has an application offset with a first value nearer to a second value of the at least one application offset than any of the other pairs of offsets.

* * * * *